US012776826B2

(12) United States Patent
Chen et al.

(10) Patent No.: US 12,776,826 B2
(45) Date of Patent: Oct. 27, 2026

(54) WIRELESS COMMUNICATION APPARATUS AND METHOD

(71) Applicant: 1FINITY Inc., Kawasaki (JP)

(72) Inventors: Zhe Chen, Beijing (CN); Qinyan Jiang, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 299 days.

(21) Appl. No.: 18/587,162

(22) Filed: Feb. 26, 2024

(65) Prior Publication Data

US 2024/0322897 A1 Sep. 26, 2024

Related U.S. Application Data

(63) Continuation of application No. PCT/CN2021/115186, filed on Aug. 29, 2021.

(51) Int. Cl.
*H04B 7/155* (2006.01)
*H04W 88/04* (2009.01)

(52) U.S. Cl.
CPC ......... *H04B 7/15535* (2013.01); *H04W 88/04* (2013.01)

(58) Field of Classification Search
CPC .............. H04B 7/15535; H04B 7/1555; H04B 7/15528; H04W 88/04
See application file for complete search history.

(56) References Cited

U.S. PATENT DOCUMENTS

| | | | |
|---|---|---|---|
| 2020/0280365 A1 | 9/2020 | Abedini et al. | |
| 2020/0358579 A1 | 11/2020 | Liu et al. | |
| 2020/0366363 A1 | 11/2020 | Li et al. | |
| 2020/0374871 A1 | 11/2020 | Liu et al. | |
| 2021/0037445 A1 | 2/2021 | Abedini et al. | |
| 2021/0044412 A1* | 2/2021 | Li ......................... | H04W 80/02 |

FOREIGN PATENT DOCUMENTS

| | | |
|---|---|---|
| CN | 110138526 A | 8/2019 |
| CN | 110167131 A | 8/2019 |
| WO | 2021/026561 A1 | 2/2021 |
| WO | 2021/026562 A1 | 2/2021 |
| WO | 2021/046140 A1 | 3/2021 |

OTHER PUBLICATIONS

The Extended European search report with the Supplementary European search report and the European search opinion, issued by the European Patent Office for corresponding European Patent Application No. 21955309.6, mailed on Sep. 24, 2024.
Notice of Reasons for Refusal issued by the Japan Patent Office for corresponding Japanese Patent Application No. 2024-513263, mailed on May 7, 2025, with an English translation.

(Continued)

*Primary Examiner* — Ayodeji O Ayotunde
(74) *Attorney, Agent, or Firm* — Myers Wolin, LLC

(57) ABSTRACT

Embodiments of this disclosure provide a wireless communication apparatus and method. The method is applicable to a repeater and includes: receiving indication information from a network device, the indication information including information related to a spatial filter and/or a reference signal.

11 Claims, 25 Drawing Sheets

(56) References Cited

OTHER PUBLICATIONS

International Search Report and Written Opinion of the International Searching Authority issued by the China National Intellectual Property Administration for corresponding International Patent Application No. PCT/CN2021/115186, mailed on May 27, 2022, with an English translation.
QUALCOMM, "New WID on NR Repeaters", document for approval, Agenda item: 9.1.5, 3GPP TSG RAN Meeting #90e, RP-202813 (revision of RP-202749), Electronic Meeting, Dec. 7-11, 2020.
Communication pursuant to Article 94(3) EPC issued by the European Patent Office for corresponding European Patent Application No. 21955309.6, mailed on Mar. 5, 2026.

* cited by examiner

801

Receiving indication information from the network device, the indication information including information related to a spatial filter and/or a reference signal

↓

802

Transmitting and/or receiving a reference signal according to the indication information

WIRELESS COMMUNICATION APPARATUS AND METHOD

CROSS-REFERENCE TO RELATED APPLICATION

This application is a continuation application of International Application PCT/CN2021/115186 filed on Aug. 29, 2021, and designated the U.S., the entire contents of which are incorporated herein by reference.

TECHNICAL FIELD

This disclosure relates to the field of communications.

BACKGROUND

In actual communication network deployment, signal coverage of different locations in a cell may vary. For example, some locations in the cell may be obstructed by buildings, resulting in significant signal attenuation. To avoid this situation and better enhance the coverage of the cell, it is a usual practice to add a repeater within the coverage range of the cell to forward signals.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Currently, a repeater typically consists of two modules. One module is a base station (BS) oriented module, which includes a transceiving device at a base station side (BS side); and the other module is a terminal equipment (UE) oriented module, which includes a transceiving device at a UE side.

On the one hand, the transceiving device at the BS side is able to receive a radio frequency (RF) signal from the base station (BS), and amplify the RF signal by a certain multiple (dB) with a corresponding amplifying circuit; and the amplified RF signal is transmitted to the terminal equipment by the transceiver at the terminal side to achieve signal amplification. On the other hand, the transceiving device at the terminal side is able to receive an RF signal from the terminal equipment and amplify the RF signal by a certain multiple (dB) with a corresponding amplifying circuit. The amplified RF signal is transmitted to the base station by the transceiving device at the base station side to achieve signal amplification. With this repeater, a strength of a downlink signal emitted by the base station will be enhanced; moreover, a strength of an uplink signal emitted by the terminal equipment will also be enhanced, thereby improving the coverage of the cell.

It was found by the inventors that transceiving devices at the base station side and/or the terminal side in the repeater do not use a beamforming technology, or are unable to transmit and/or receive reference signals related to the beamforming technology. Hence, when an RF signal is amplified by the repeater, as no beamforming is performed, a coverage angle of a forwarded signal is relatively large, resulting in a limited gain of the repeater; and furthermore, the forwarded signal that is not beamformed may cause unnecessary interference to the terminal equipments of neighboring cells, thereby leading to a decrease in system performances.

In order to solve one or more of the above problems, embodiments of this disclosure provide a wireless communication apparatus and method, in which a repeater receives indication information including information related to a spatial filter and/or a reference signal from a network device, and according to the indication information, the repeater is able to receive and/or transmit signals to a network device and/or a terminal equipment by using a beamforming technology, and/or the repeater is able to receive and/or transmit reference signals to the network device and/or a terminal equipment, thereby using beamforming information of the reference signals in transmitting and/or receiving signals. Thus, gains of the repeater in transceiving signals may be enhanced, interference to neighboring cells may be avoided, and system performances may be improved.

According to a first aspect of the embodiments of this disclosure, there is provided a wireless communication apparatus, applicable to a repeater, the apparatus including: a first module configured to receive indication information from a network device, the indication information comprising information related to a spatial filter and/or a reference signal.

According to a second aspect of the embodiments of this disclosure, there is provided a wireless communication apparatus, applicable to a network device, the apparatus including: a ninth module configured to transmit indication information to a repeater, the indication information comprising information related to a spatial filter and/or a reference signal.

According to a third aspect of the embodiments of this disclosure, there is provided a repeater, the repeater including the apparatus as described in the embodiment of the first aspect of this disclosure.

According to a fourth aspect of the embodiments of this disclosure, there is provided a network device, including the apparatus as described in the embodiment of the second aspect of this disclosure.

According to a fifth aspect of the embodiments of this disclosure, there is provided a communication system, including the repeater as described in the embodiment of the third aspect of this disclosure and/or the network device as described in the embodiment of the fourth aspect of this disclosure.

According to a sixth aspect of the embodiments of this disclosure, there is provided a wireless communication method, applicable to a repeater, the method including: receiving indication information from a network device, the indication information including information related to a spatial filter and/or a reference signal.

According to a seventh aspect of the embodiments of this disclosure, there is provided a wireless communication method, applicable to a network device, the method including: transmitting indication information to a repeater, the indication information including information related to a spatial filter and/or a reference signal.

According to an eighth aspect of the embodiments of this disclosure, there is provided a computer readable program, which, when executed in a wireless communication apparatus or a repeater, will cause the wireless communication apparatus or the repeater to carry out the wireless communication method as described in the embodiment of the sixth aspect of this disclosure.

According to a ninth aspect of the embodiments of this disclosure, there is provided a computer readable medium, including a computer readable program code, which will cause a wireless communication apparatus or a repeater to carry out the wireless communication method as described in the embodiment of the sixth aspect of this disclosure.

According to a tenth aspect of the embodiments of this disclosure, there is provided a computer readable program, which, when executed in a wireless communication apparatus or a network device, will cause the wireless communication apparatus or the network device to carry out the wireless communication method as described in the embodiment of the seventh aspect of this disclosure.

According to a eleventh aspect of the embodiments of this disclosure, there is provided a computer readable medium, including a computer readable program code, which will cause a wireless communication apparatus or a network device to carry out the wireless communication method as described in the embodiment of the seventh aspect of this disclosure.

An advantage of the embodiments of this disclosure exists in that the repeater receives indication information including information related to a spatial filter and/or a reference signal from a network device, and according to the indication information, the repeater is able to receive and/or transmit signals to a network device and/or a terminal equipment by using a beamforming technology, and/or the repeater is able to receive and/or transmit reference signals to the network device and/or a terminal equipment, thereby using beamforming information of the reference signals in transmitting and/or receiving signals. Thus, gains of the repeater in transceiving signals may be enhanced, interference to neighboring cells may be avoided, and system performances may be improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
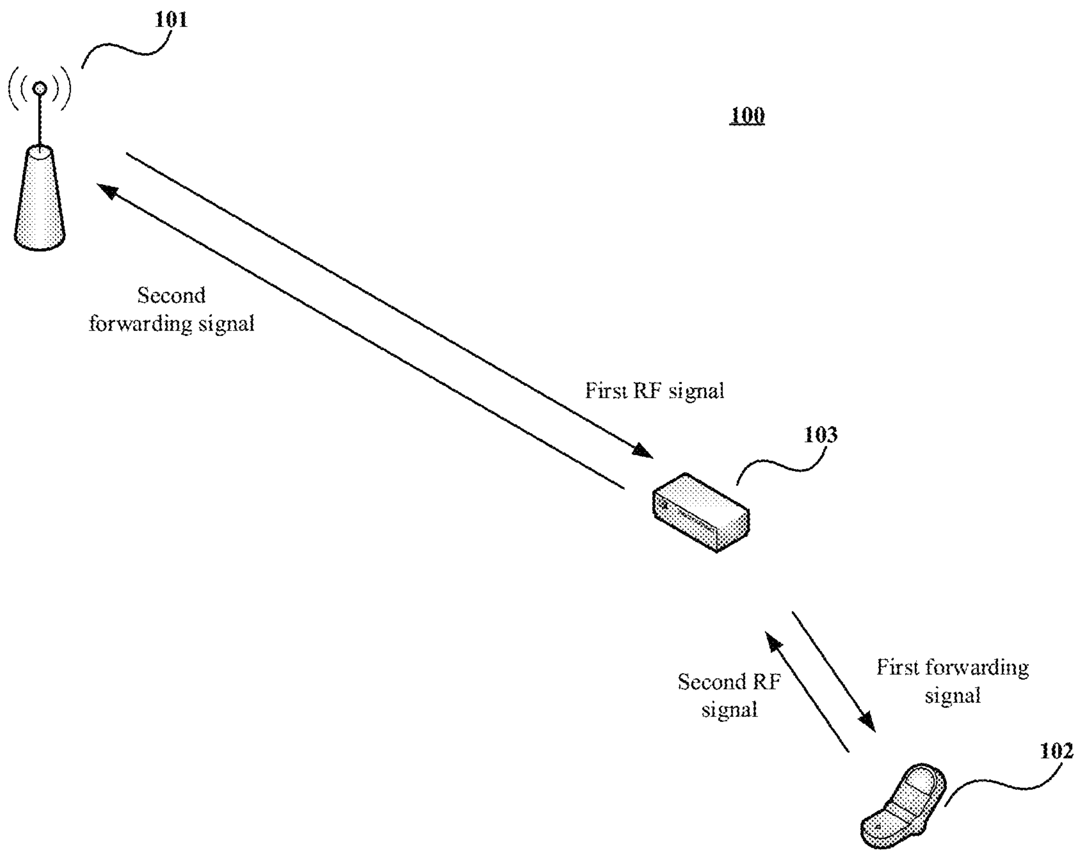
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "according to" should be understood as "at least partially according to", except specified otherwise.

In the embodiments of this disclosure, "multiple" or "a plurality of" refers to at least two.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a node and/or donor in an IAB architecture, a base station (BS), an access point (AP), a transmission reception point (TRP), a broadcast transmitter, a mobile management entity (MME), a gateway, a server, a radio network controller (RNC), a base station controller (BSC), etc.

Wherein, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "terminal equipment (TE)" refers to, for example, an equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, the term "repeater" refers to a relay device, such as a relay device arranged in a serving cell to which a network device corresponds, which is used to forward transmission signals between the network device and a terminal equipment. In addition, the repeater may also be a repeater node.

Scenarios of the embodiments of this disclosure shall be described below by way of examples; however, the embodiments of this disclosure are not limited thereto.

FIG. 1 is a schematic diagram of a communication system of this disclosure. As shown in FIG. 1, a communication system 100 may include a network device 101, a terminal equipment 102 and a repeater 103.

In the embodiments of this disclosure, existing traffics or traffics that may be implemented in the future may be performed between the network device 101 and the terminal equipment 102.

For example, such traffics may include but not limited to enhanced mobile broadband (eMBB), massive machine type communication (MTC), and ultra-reliable and low-latency communication (URLLC), etc.

As shown in FIG. 1, the repeater 103 receives a first RF signal from the network device 101, amplifies the signal to obtain a first forwarding signal and transmits it to the terminal equipment 102, and/or, the repeater 103 receives a second RF signal from the terminal equipment 102, amplifies the signal to obtain a second forwarding signal and transmits it to the network device 101.

Embodiment 1

Figure 2:
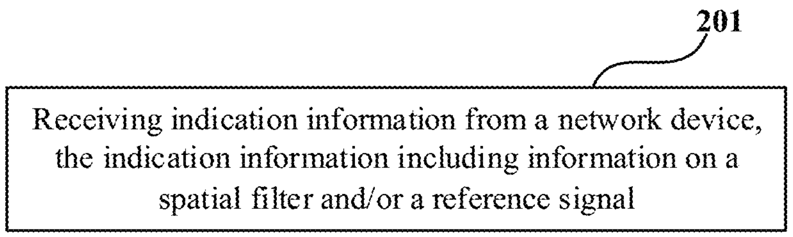
FIG. 2 is a schematic diagram of the wireless communication method of embodiment 1 of this disclosure.

The embodiment of this disclosure provides a wireless communication method, applicable to a repeater. FIG. 2 is a schematic diagram of the wireless communication method of embodiment 1 of this disclosure. As shown in FIG. 2, the method includes:

step 201: receiving indication information from a network device, the indication information including information related to a spatial filter and/or a reference signal.

Hence, the repeater is able to receive and/or transmit signals to a network device and/or a terminal equipment by using the beamforming technology, and/or the repeater is able to receive and/or transmit reference signals to the network device and/or a terminal equipment, thereby using beamforming information of the reference signals in transmitting and/or receiving signals. Thus, gains of the repeater in transceiving signals may be enhanced, interference to neighboring cells may be avoided, and system performances may be improved.

In the embodiments of this disclosure, the repeater is a relay device, such as a relay device arranged in a serving cell to which a network device corresponds, which is used to forward transmission signals between the network device and a terminal equipment. In addition, the repeater may also be a repeater node.

For example, the repeater is affiliated to a serving cell to which the network device corresponds.

In the embodiments of this disclosure, "spatial filter" may also be replaced with "beam", that is, in this disclosure, both "a spatial filter" and "a beam" may be used to represent beamforming information, both of which are equivalent concepts.

In the embodiments of this disclosure, the reference signal includes, for example, at least one of an SSB, an SRS, a CSI-RS and a repeater-specific reference signal.

In the embodiments of this disclosure, the indication information may refer to at least one piece of the following indication information: indication information used to indicate information related to a spatial filter and/or a reference signal used by the repeater in transmitting a first signal; indication information used to indicate information related to a spatial filter and/or a reference signal used by the repeater in receiving a second signal; indication information used to indicate that the repeater transmits a reference signal; and indication information used to indicate that the repeater receives a reference signal.

In the embodiments of this disclosure, the wireless communication method of this disclosure shall be described by taking that the indication information is used for beam indication of transceiving signals at a terminal side of the repeater as an example. However, the indication information and the wireless communication method of this disclosure are also applicable to beam indication of transceiving signals at a network device side of the repeater.

For example, the first signal is a first forwarding signal that forwards a signal received from the network device to a terminal equipment, and the second signal is a signal to be forwarded received from a terminal equipment.

In the embodiments of this disclosure, "a signal received from the network device or a terminal equipment" is "a signal to be forwarded", or may also be referred to as "a signal for being forwarded".

For example, the signal received by the repeater from the network device is "a signal to be forwarded" or "a signal for being forwarded" to be forwarded to a terminal equipment, which is used for communication with terminal equipments; the "signal to be forwarded" or "signal for being forwarded" is amplified with a certain gain to obtain a first forwarding signal, i.e. a first signal; and the repeater transmits the first forwarding signal to the terminal equipment, that is, the first forwarding signal is generated according to DL transmission from gNB to a repeater node.

For another example, the signal received by the repeater from the terminal equipment is "a signal to be forwarded" or "a signal for being forwarded" to be forwarded to the network device, i.e. a second signal, which is used for communication with BS (gNB); and the "signal to be forwarded" or "signal used for being forwarded" is amplified with a certain gain to obtain a second forwarding signal, which is then transmitted by the repeater to the network device, that is, the second forwarding signal is generated according to UL transmission from the terminal equipment to repeater node.

In the embodiments of this disclosure, the indication information used to indicate that the repeater transmits a reference signal may include: indication information used to indicate information related to a spatial filter and/or a reference signal used by the repeater in transmitting a reference signal;

and the indication information used to indicate that the repeater receives a reference signal includes: indication information used to indicate information related to a spatial filter and/or a reference signal used by the repeater in receiving a reference signal.

In the embodiments of this disclosure, the indication information includes the information related to the spatial filter and/or the reference signal, for example, the information related to the spatial filter and/or the reference signal includes at least one piece of the following information: a spatial filter index and/or a beam index; a reference signal index; the number of antenna ports of a reference signal; antenna polarization information; beam width information; and beam direction information.

In the embodiments of this disclosure, the spatial filter may be indicated implicitly by at least one of the spatial filter index, beam index and the reference signal index.

For example, the network device only indicates an index of a used spatial filter, beam or reference signal, and the repeater determines a specifically used spatial filter according to the index. In this case, for example, the repeater receives CSI-RS configuration, the CSI-RS configuration being neither used for reception of a CSI-RS, nor used for transmission of a CSI-RS, but rather used by the repeater in determining the used spatial filter.

In the embodiments of this disclosure, the spatial filter may also be explicitly indicated by the antenna polarization information, beam width information and beam direction information. That is, a specific spatial filter is indicated to the repeater via the antenna polarization information, beam width information and beam direction information.

For example, the number of antenna ports of the reference signal is 1 or 2.

For example, the antenna polarization information includes single polarization or multi-polarization.

In the embodiments of this disclosure, the above two may be combined, that is, the number of antenna ports of the reference signal and antenna polarization information may be combined or correspond, for example, the number of 1 of antenna ports corresponds to a single polarization antenna, and the number of 2 of antenna ports corresponds to a dual-polarization antenna; or, in other words, if the antenna of the repeater is unipolar, the number of antenna ports of a corresponding reference signal is 1; and if the antenna of the repeater is bipolar, the number of antenna ports of a corresponding reference signal is 2.

For example, the beam width information includes the number n1 of antenna ports in a first dimension and the number n2 of antenna ports in a second dimension. For example, the first dimension is a horizontal dimension, and the second dimension is a vertical dimension.

Where, n1≤N1, and n2≤N2, N1 and N2 being a maximum number of antenna ports in the first dimension supported by the repeater and a maximum number of antenna ports in the second dimension supported the repeater, respectively.

For example, the beam direction information includes a codebook index.

For example, the repeater may be configured with one or more candidate codebook indices. Each codebook index corresponds to an angle of departure or an antenna transmission phase. The network device transmits a codebook index indication to the repeater, the indication corresponding to one or more of the above candidate codebook indices. Hence, the repeater determines the spatial filter (such as the beam direction and/or the beam width) used for transmitting or receiving signals according to the indicated codebook index.

In the embodiments of this disclosure, the repeater may transmit a first signal and/or receive a second signal according to the indication information after receiving the indication information.

In the embodiments of this disclosure, for example, a first module of the repeater receives the above indication information from the network device.

In the embodiments of this disclosure, the first module is similar to a module of a terminal equipment, for example, the first module may also be referred to as a mobile terminal (MT) module.

In the embodiments of this disclosure, the repeater may forward signals via a second module, and the second module may amplify a received analog signal with a certain gain, and then forwards the amplified signal. For example, the second module includes a transceiver at a network side, a transceiver at a terminal side, and a signal amplification circuit. For another example, the second module may also be referred to as an RU (radio unit) module.

Figure 3:
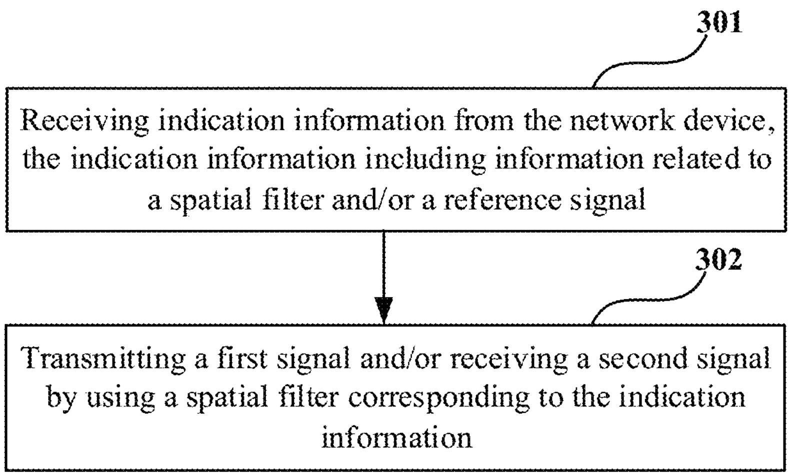
FIG. 3 is a schematic diagram of an implementation of the wireless communication method of embodiment 1 of this disclosure.

FIG. 3 is a schematic diagram of one implementation of the wireless communication method in embodiment 1 of this disclosure. As shown in FIG. 3, the method includes: step 301: receiving indication information from the network device, the indication information including information related to a spatial filter and/or a reference signal; and step 302: transmitting a first signal and/or receiving a second signal by using a spatial filter corresponding to the indication information.

In the embodiments of this disclosure, “a spatial filter corresponding to the indication information” refers to a spatial filter determined according to the indication information. For example, as described above, the spatial filter corresponding to the indication information may be determined implicitly or explicitly.

In step 302, the spatial filter corresponding to the indication information may be used to transmit the first signal, i.e. the forwarding signal received from the network device and forwarded to a terminal equipment, and/or, the spatial filter corresponding to the indication information may be used to receive the second signal, i.e. the signal to be forwarded received from a terminal equipment.

Figure 4:
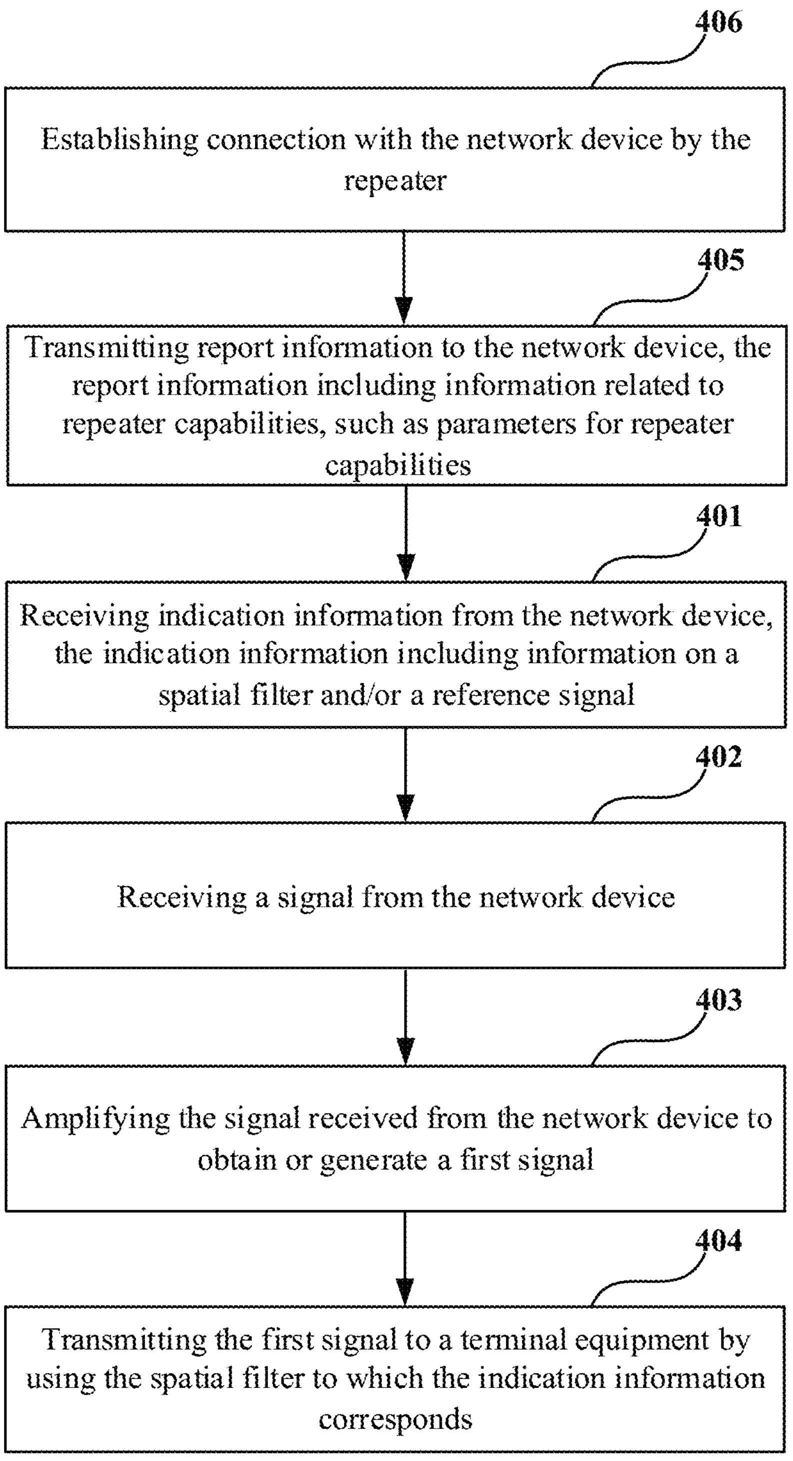
FIG. 4 is another schematic diagram of the implementation of the wireless communication method of embodiment 1 of this disclosure.

FIG. 4 is another schematic diagram of one implementation of the wireless communication method in embodiment 1 of this disclosure. As shown in FIG. 4, the method includes:

step 401: receiving indication information from the network device, the indication information including information related to a spatial filter and/or a reference signal;

step 402: receiving a signal from the network device;

step 403: amplifying the signal received from the network device with a certain gain to obtain or generate a first signal, i.e. the first forwarding signal; and step 404: transmitting the first signal to a terminal equipment by using the spatial filter to which the indication information corresponds.

In the embodiments of this disclosure, an order of execution of steps 401 and 402 is not limited, which may be executed in parallel or sequentially.

In the embodiments of this disclosure, as shown in FIG. 4, the method may further include:

step 405: transmitting report information to the network device, the report information including information related to repeater capabilities, such as parameters for repeater capabilities.

In the embodiments of this disclosure, the report information is used for the network device to determine a scheduling and/or indication mode corresponding to repeater capabilities, such as being used for the network device to indicate the spatial filter or beam or beamforming method which the repeater utilizes.

For example, the report information includes at least one piece of the following information: a maximum number of beams supported by the repeater; and antenna information of the repeater.

For example, the maximum number of beams supported by the repeater refers to an upper limit of candidate beams that hardware of the repeater may support. The maximum number of beams supported by the repeater is, for example, a maximum number of beams supported by a transmitter or transceiver at a terminal side of the repeater. The antenna information of the repeater is, for example, antenna information of the transmitter or transceiver at the terminal side of the repeater.

For example, the maximum number of beams supported by the repeater includes at least one of the following: a maximum number of candidate spatial filters or a maximum number of candidate beams, and a maximum number of candidate spatial filter RSs (reference signals) or a maximum number of candidate beam RSs.

For example, the maximum number of candidate spatial filter RSs or candidate beam RSs includes a maximum number of antenna ports for candidate spatial filter RSs or a maximum number of antenna ports for candidate beam RSs. For example, when the repeater supports a cross-polarized antenna architecture, the maximum number of antenna ports is 2, and when the repeater does not support a cross-polarized antenna architecture, the maximum number of antenna ports is 1.

For example, the antenna information of the repeater includes at least one of the following: antenna panel information, antenna polarization information, and antenna dimension information.

For example, the antenna panel information includes a single panel, multi-panel, or the number of antenna panels.

For example, the antenna polarization information includes cross polarization or single polarization.

For example, the antenna dimension information includes the number of antenna ports in two dimensions supported by the repeater, that is, a maximum number N1 of antenna ports in the first dimension supported by the repeater and a maximum number N2 of antenna ports in the second dimension supported by the repeater. For example, the first dimension is a horizontal dimension, and the second dimension is a vertical dimension.

Furthermore, the antenna dimension information corresponds to antenna panels, that is, for each antenna panel, there will be a corresponding N1, N2, or all antenna panels will correspond to identical N1, N2.

In the embodiments of this disclosure, as shown in FIG. 4, the method may further include:

step 406: establishing connection with the network device by the repeater.

For example, an eighth module of the repeater establishes the connection with the network device. For example, a process of establishing the connection is similar to a mode of establishing connection with a network device by an NR terminal equipment.

In the embodiments of this disclosure, the eighth module may be the same module as the first module.

Figure 5:
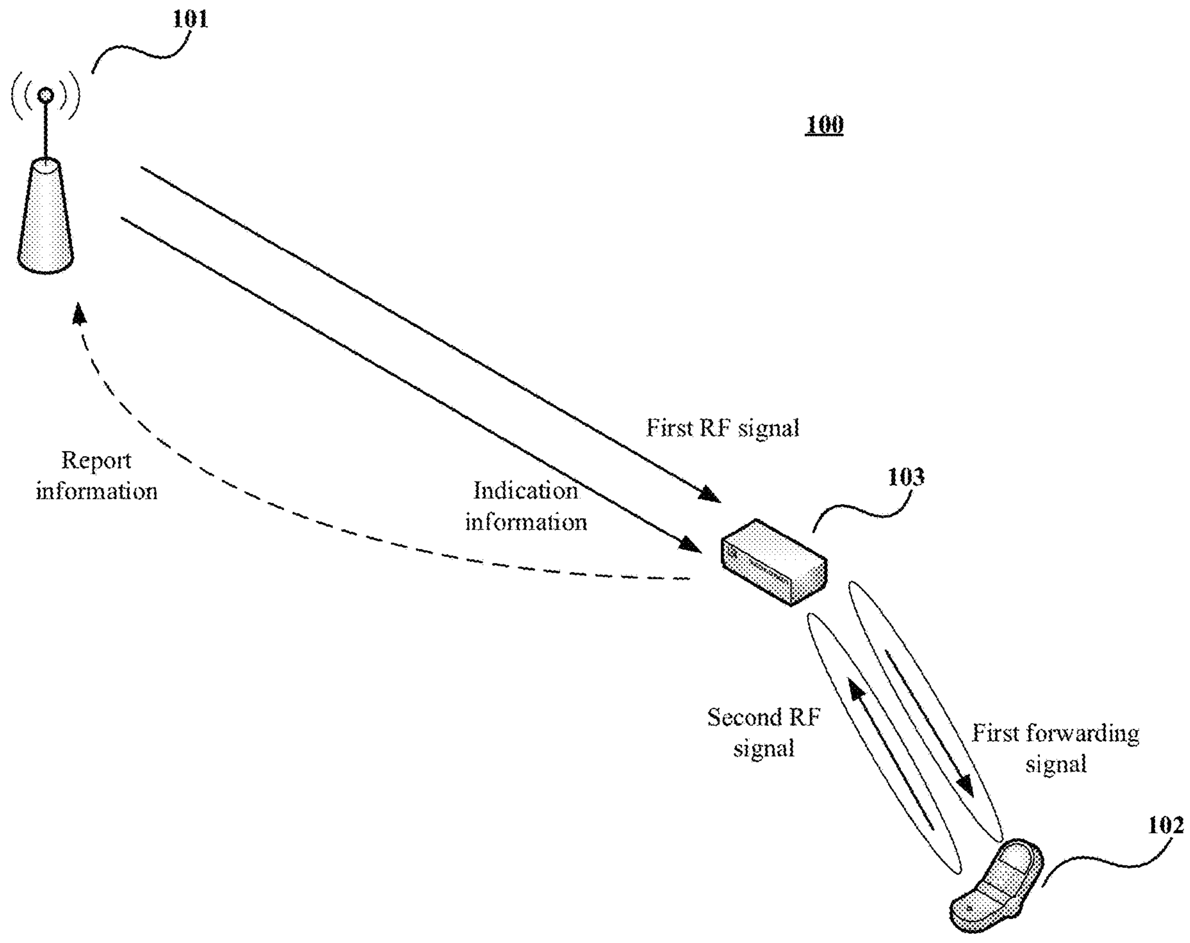
FIG. 5 is a schematic diagram of an implementation of the communication system of embodiment 1 of this disclosure.

The method shown in FIG. 4 shall be described below by way of an example. FIG. 5 is a schematic diagram of one implementation of the communication system in embodiment 1 of this disclosure.

As shown in FIG. 5, first, the repeater 103 establishes connection with the network device 101; then, the repeater 103 transmits report information to the network device 101; the network device 101 transmits indication information and a first RF signal to the repeater 103; the repeater 103 receives the first RF signal via the receiver at a network side and amplifies it with a certain gain to obtain the first forwarding signal. Furthermore, the repeater 103 transmits the first forwarding signal to the terminal equipment 102 via the transmitter at the terminal side by using the spatial filter to which the indication information corresponds; in addition, the repeater 103 may receive a second RF signal, i.e. the signal to be forwarded to the network device 101, from the terminal equipment 102 via the receiver at the terminal side, by using the spatial filter to which the indication information corresponds (i.e. the spatial filter transmitting the first forwarding signal, which uses uplink and downlink reciprocity).

Figure 6:
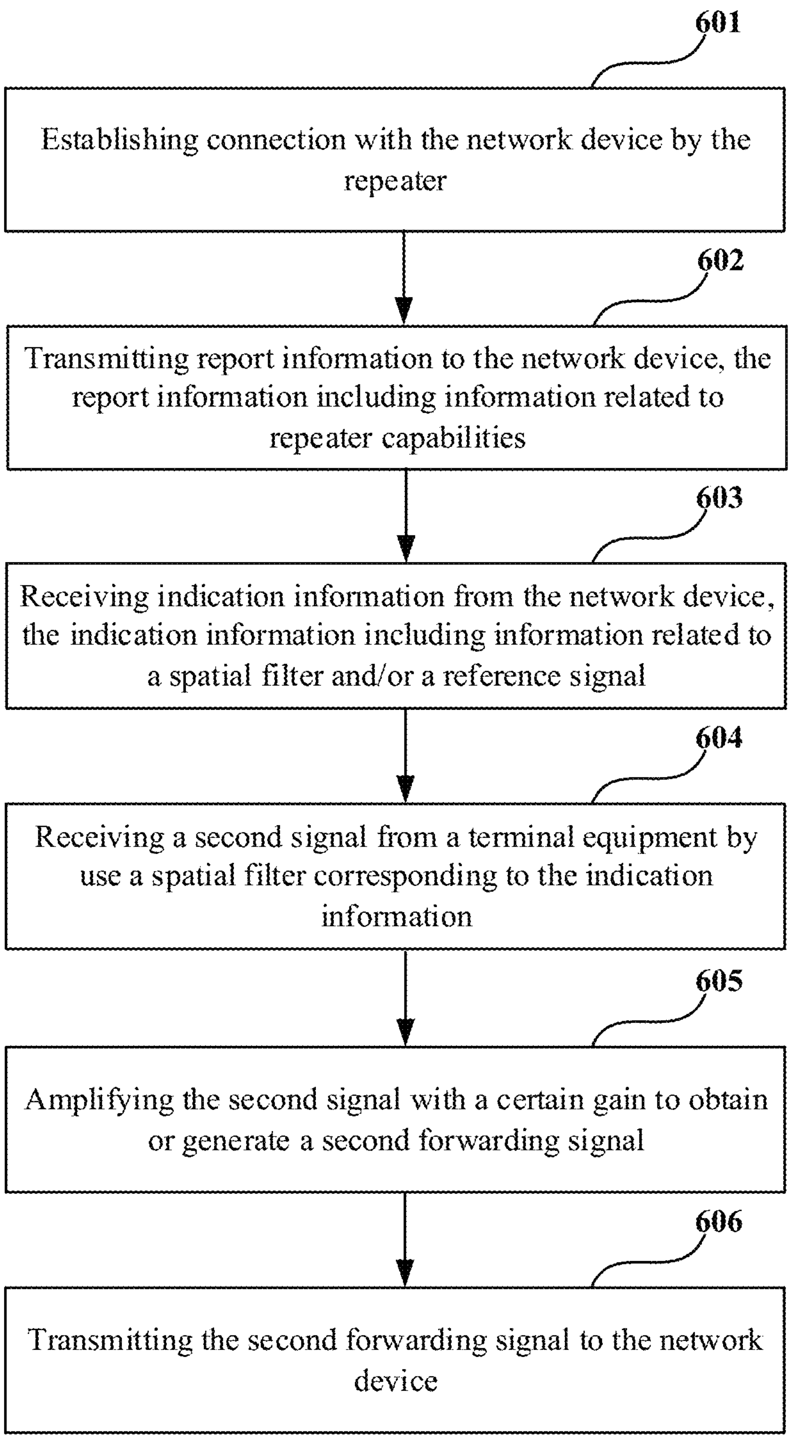
FIG. 6 is a further schematic diagram of the implementation of the wireless communication method of embodiment 1 of this disclosure.

FIG. 6 is another schematic diagram of one implementation of the wireless communication method in embodiment 1 of this disclosure. As shown in FIG. 6, the method includes:

step 601: establishing connection with the network device by the repeater;

step 602: transmitting report information to the network device, the report information including information related to repeater capabilities;

step 603: receiving indication information from the network device, the indication information including information related to a spatial filter and/or a reference signal;

step 604: receiving a second signal from a terminal equipment by use a spatial filter corresponding to the indication information;

step 605: amplifying the second signal with a certain gain to obtain or generate a second forwarding signal; and step 606: transmitting the second forwarding signal to the network device.

In the embodiments of this disclosure, an order of execution of steps 603 and 604 is not limited, which may be executed in parallel or sequentially.

Reference may be made to the relevant steps in FIG. 4 for implementations of steps 601-606 above may, which shall not be repeated herein any further.

Figures 7, 8:
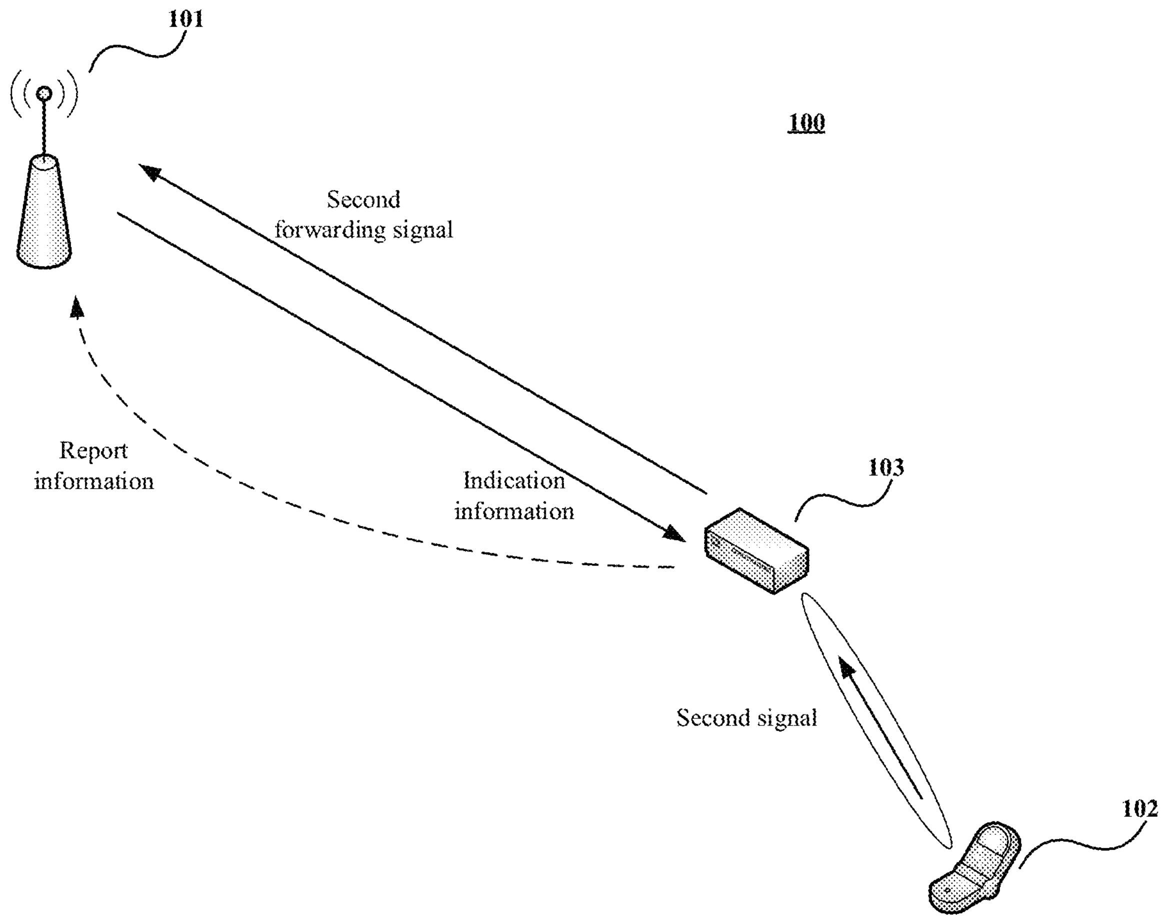
FIG. 7 is a schematic diagram of another implementation of the communication system of embodiment 1 of this disclosure.
FIG. 8 is a schematic diagram of another implementation of the wireless communication method of embodiment 1 of this disclosure.

The method shown in FIG. 6 shall be described below by way of an example. FIG. 7 is a schematic diagram of another implementation of the communication system in embodiment 1 of this disclosure.

As shown in FIG. 7, first, the repeater 103 establishes connection with the network device 101; then, the repeater 103 transmits report information to the network device 101; the network device 101 transmits indication information to the repeater 103; the repeater 103 receives the second signal, i.e. a second RF signal, via a receiver the terminal side by using the spatial filter to which the indication information corresponds; the repeater 103 amplifies the second forwarding signal with a certain gain to obtain the second forwarding signal. Furthermore, the repeater 103 transmits the second forwarding signal to the network device 101; in addition, the repeater 103 may transmit the first signal, i.e. the first forwarding signal to the terminal equipment 102 via the transmitter at the terminal side, by using the spatial filter to which the indication information corresponds (i.e. the spatial filter receiving the first signal, which uses uplink and downlink reciprocity).

In the embodiments of this disclosure, the indication information includes the information related to a spatial filter and/or a reference signal, for example, the information related to the reference signal includes configuration information of the reference signal, so that the repeater transmits and/or receives the reference signal, such as transmitting the reference signal to a terminal equipment, and/or receiving the reference signal from a terminal equipment.

For example, the reference signal includes at least one of an SSB, an SRS, a CSI-RS, and a repeater-specific reference signal.

For example, the reference signal corresponds to UL or DL transmission from the repeater node to terminal equipments.

For example, the reference signal is used for communication with terminal equipments.

FIG. 8 is a schematic diagram of another implementation of the wireless communication method in embodiment 1 of this disclosure. As shown in FIG. 8, the method includes:

step 801: receiving indication information from the network device, the indication information including information related to a spatial filter and/or a reference signal; and step 802: transmitting and/or receiving a reference signal according to the indication information.

In step 802, for example, the spatial filter to which the indication information corresponds transmits and/or receives the reference signal.

In the embodiments of this disclosure, for example, a third module of the repeater transmits and/or receives the reference signal according to the indication information. The third module is similar to a communication module of a network device, for example, the third module may also be referred to as a distributed unit (DU).

In step 802, the reference signal is transmitted and/or received according to the indication information, for example, the reference signal is transmitted to a terminal equipment according to the indication information, and/or the reference signal is received from a terminal equipment according to the indication information, which shall be respectively described below.

Figure 9:
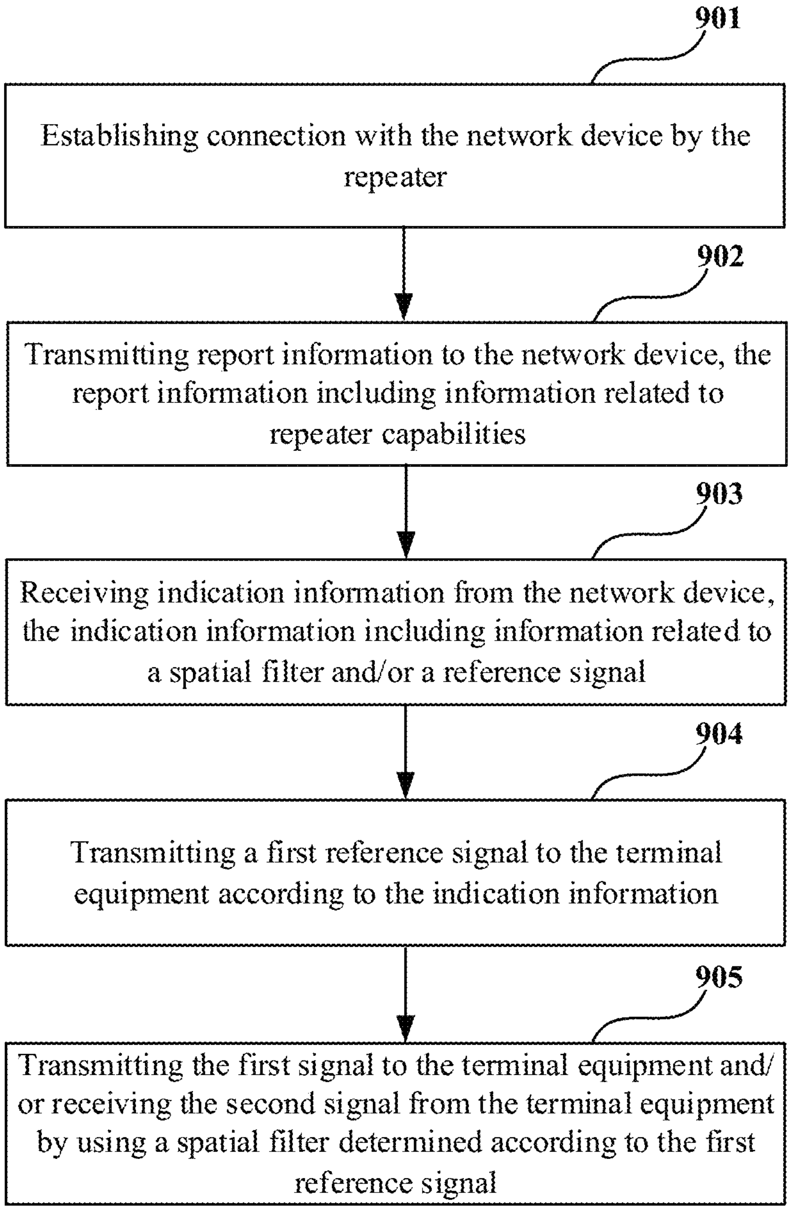
FIG. 9 is another schematic diagram of the other implementation of the wireless communication method of embodiment 1 of this disclosure.

FIG. 9 is another schematic diagram of the other implementation of the wireless communication method in embodiment 1 of this disclosure. As shown in FIG. 9, the method includes:

step 901: establishing connection with the network device by the repeater;

step 902: transmitting report information to the network device, the report information including information related to repeater capabilities;

step 903: receiving indication information from the network device, the indication information including information related to a spatial filter and/or a reference signal;

step 904: transmitting a first reference signal to a terminal equipment according to the indication information; and step 905: transmitting the first signal to the terminal equipment and/or receiving the second signal from the terminal equipment by using a spatial filter determined according to the first reference signal.

In step 905, for example, the first signal is transmitted to the terminal equipment and/or the second signal is received from the terminal equipment by using a spatial filter identical to a spatial filter used in transmitting the first reference signal. Transmitting the first signal and receiving the second signal shall be respectively described below.

Figure 10:
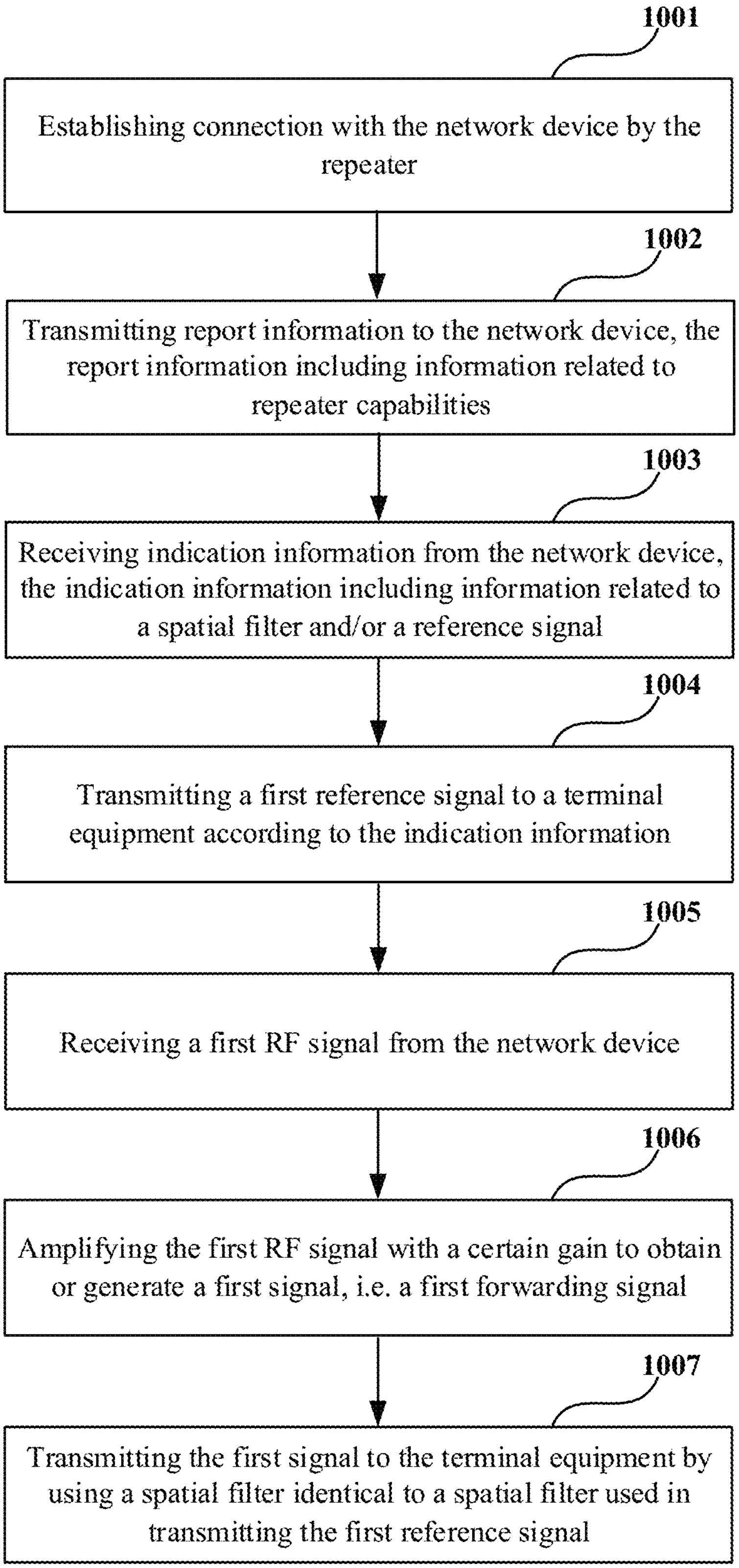
FIG. 10 is a further schematic diagram of the other implementation of the wireless communication method of embodiment 1 of this disclosure.

FIG. 10 is a further schematic diagram of still another implementation of the wireless communication method in embodiment 1 of this disclosure. As shown in FIG. 10, the method includes:

step 1001: establishing connection with the network device by the repeater;

step 1002: transmitting report information to the network device, the report information including information related to repeater capabilities;

step 1003: receiving indication information from the network device, the indication information including information related to a spatial filter and/or a reference signal;

step 1004: transmitting a first reference signal to a terminal equipment according to the indication information;

step 1005: receiving a first RF signal from the network device;

step 1006: amplifying the first RF signal with a certain gain to obtain or generate a first signal, i.e. a first forwarding signal; and step 1007: transmitting the first signal to the terminal equipment by using a spatial filter identical to a spatial filter used in transmitting the first reference signal.

Figure 11:
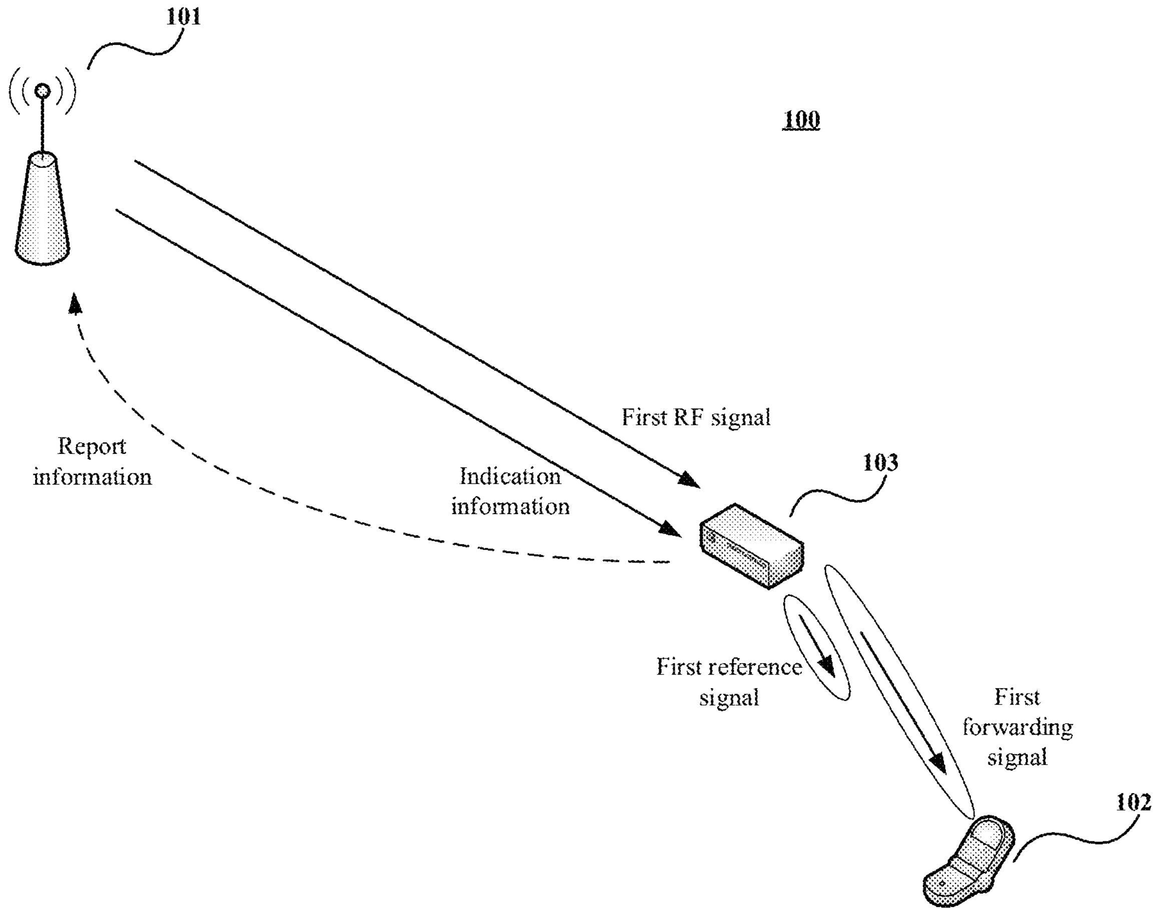
FIG. 11 is a schematic diagram of a further implementation of the communication system of embodiment 1 of this disclosure.

The method shown in FIG. 10 shall be described below by way of an example. FIG. 11 is a schematic diagram of the other implementation of the communication system in embodiment 1 of this disclosure.

As shown in FIG. 11, first, the repeater 103 establishes connection with the network device 101; then, the repeater 103 transmits report information to the network device 101; the network device 101 transmits indication information to the repeater 103; the third module of the repeater 103 transmits the first reference signal to the terminal equipment 102 by using the spatial filter to which the indication corresponds; the repeater 103 receives the first RF signal from the network device 101 via the receiver at the network side and amplifies it with a certain gain to obtain the first signal, i.e. the first forwarding signal. Furthermore, the repeater 103 transmits the first forwarding signal to the terminal equipment 102 via the transmitter at the terminal side by using a spatial filter identical to a spatial filter used in transmitting the first reference signal.

Figure 12:
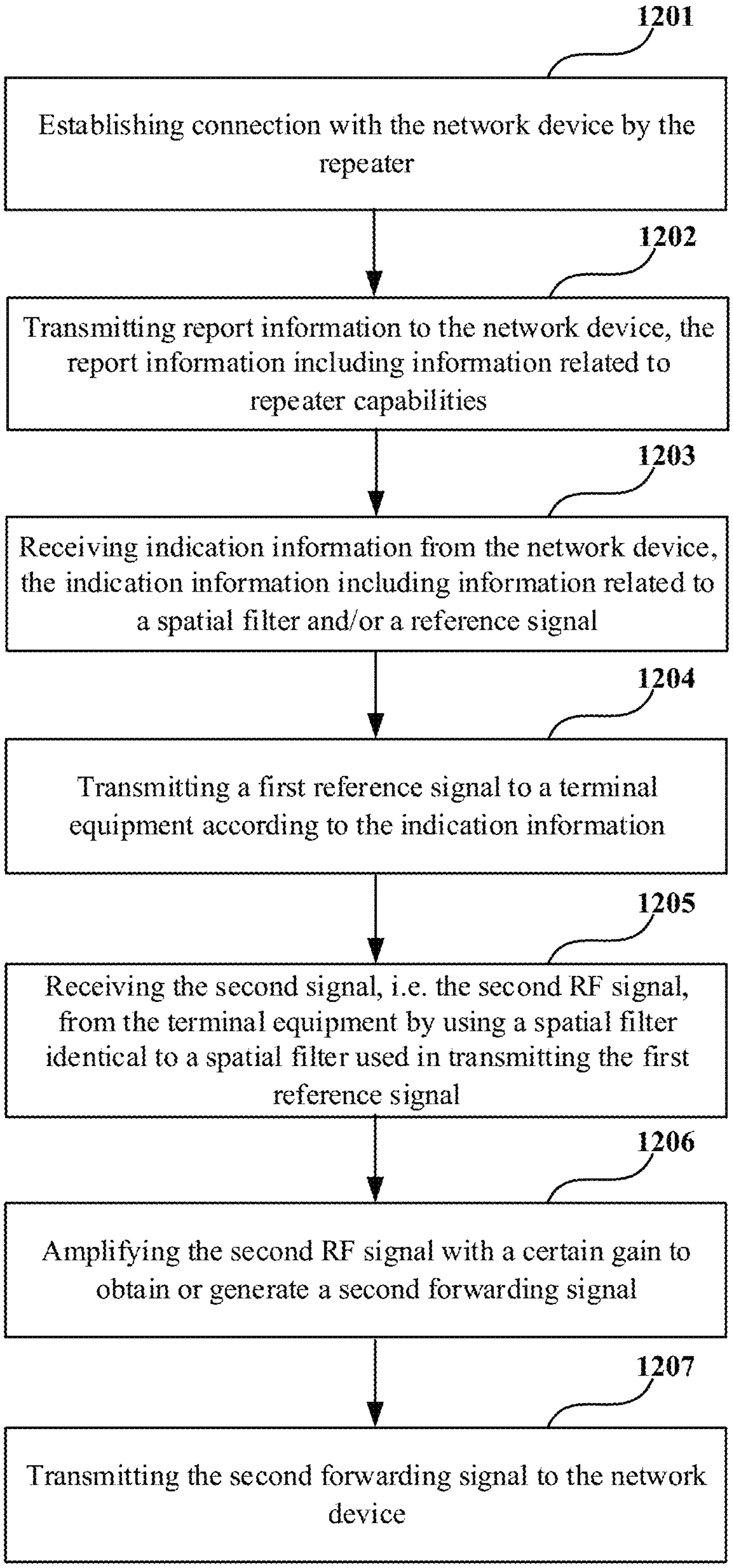
FIG. 12 is still another schematic diagram of the other implementation of the wireless communication method of embodiment 1 of this disclosure.

FIG. 12 is still another schematic diagram of further another implementation of the wireless communication method in embodiment 1 of this disclosure. As shown in FIG. 12, the method includes:

step 1201: establishing connection with the network device by the repeater;

step 1202: transmitting report information to the network device, the report information including information related to repeater capabilities;

step 1203: receiving indication information from the network device, the indication information including information related to a spatial filter and/or a reference signal;

step 1204: transmitting a first reference signal to a terminal equipment according to the indication information;

step 1205: receiving the second signal, i.e. the second RF signal, from the terminal equipment by using a spatial filter identical to a spatial filter used in transmitting the first reference signal;

step 1206: amplifying the second RF signal with a certain gain to obtain or generate a second forwarding signal; and step 1207: transmitting the second forwarding signal to the network device.

Figure 13:
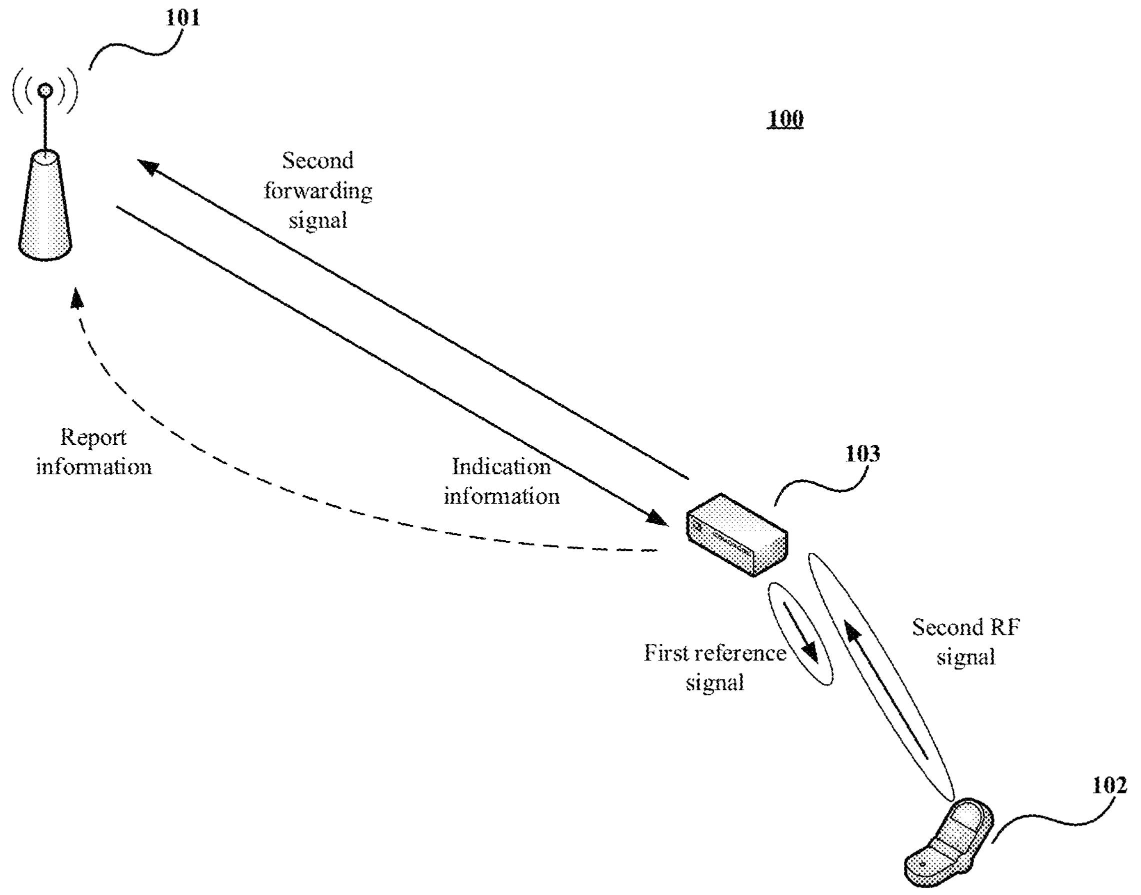
FIG. 13 is a schematic diagram of still another implementation of the communication system of embodiment 1 of this disclosure.

The method shown in FIG. 12 shall be described below by way of an example. FIG. 13 is a schematic diagram of the further implementation of the communication system in embodiment 1 of this disclosure.

As shown in FIG. 13, first, the repeater 103 establishes connection with the network device 101; then, the repeater 103 transmits report information to the network device 101; the network device 101 transmits indication information to the repeater 103; the third module of the repeater 103 transmits the first reference signal to the terminal equipment 102 by using the spatial filter to which the indication corresponds; the repeater 103 receives the second signal, i.e. the second RF signal, from the terminal equipment 102 by using the spatial filter to which the indication corresponds, and amplifies it with a certain gain to obtain the second forwarding signal. Furthermore, the repeater 103 transmits the second forwarding signal to the network device 101 via the transmitter at the network side.

Figure 14:
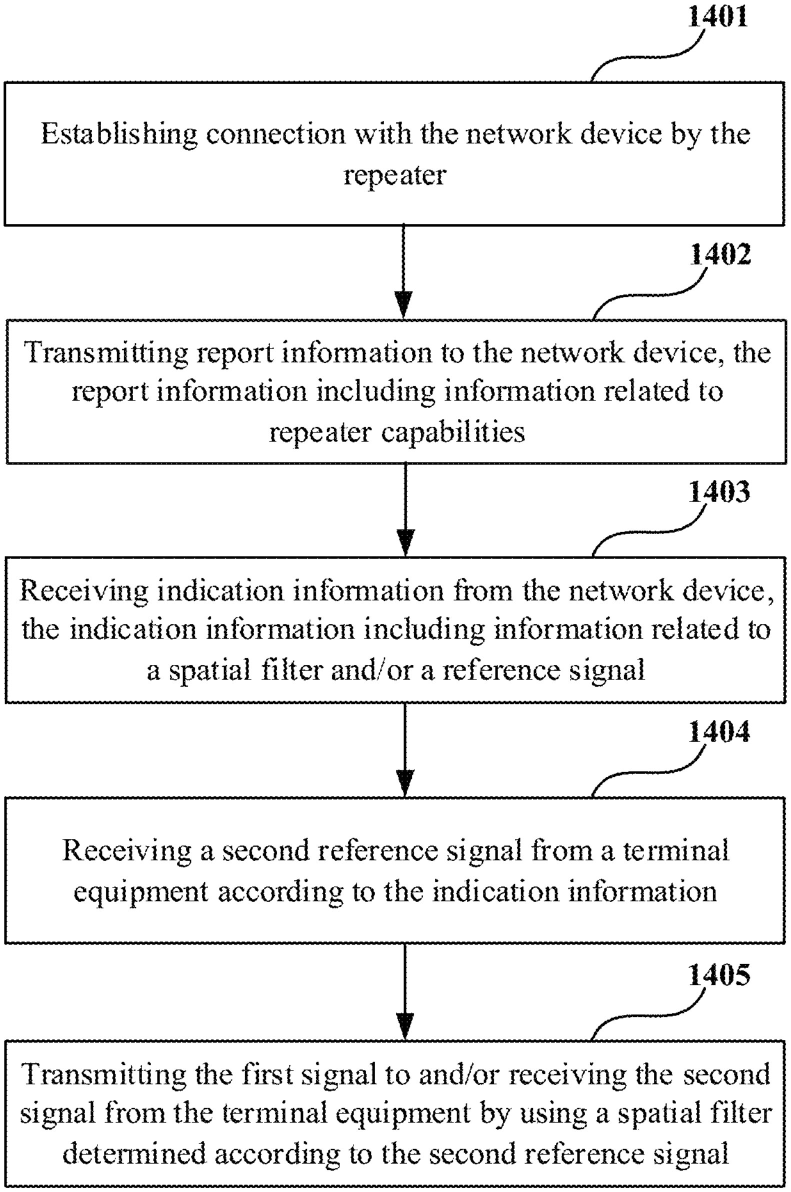
FIG. 14 is yet another schematic diagram of the other implementation of the wireless communication method of embodiment 1 of this disclosure.

FIG. 14 is a further schematic diagram of the other implementation of the wireless communication method in embodiment 1 of this disclosure. As shown in FIG. 14, the method includes:

step 1401: establishing connection with the network device by the repeater;

step 1402: transmitting report information to the network device, the report information including information related to repeater capabilities;

step 1403: receiving indication information from the network device, the indication information including information related to a spatial filter and/or a reference signal;

step 1404: receiving a second reference signal from a terminal equipment according to the indication information;

step 1405: transmitting the first signal to and/or receiving the second signal from the terminal equipment by using a spatial filter determined according to the second reference signal.

In step 1405, for example, the first signal is transmitted to the terminal equipment and/or the second signal is received from the terminal equipment by using a spatial filter identical to a spatial filter used in receiving the second reference signal. Transmitting the first signal and receiving the second signal shall be respectively described below.

Figure 15:
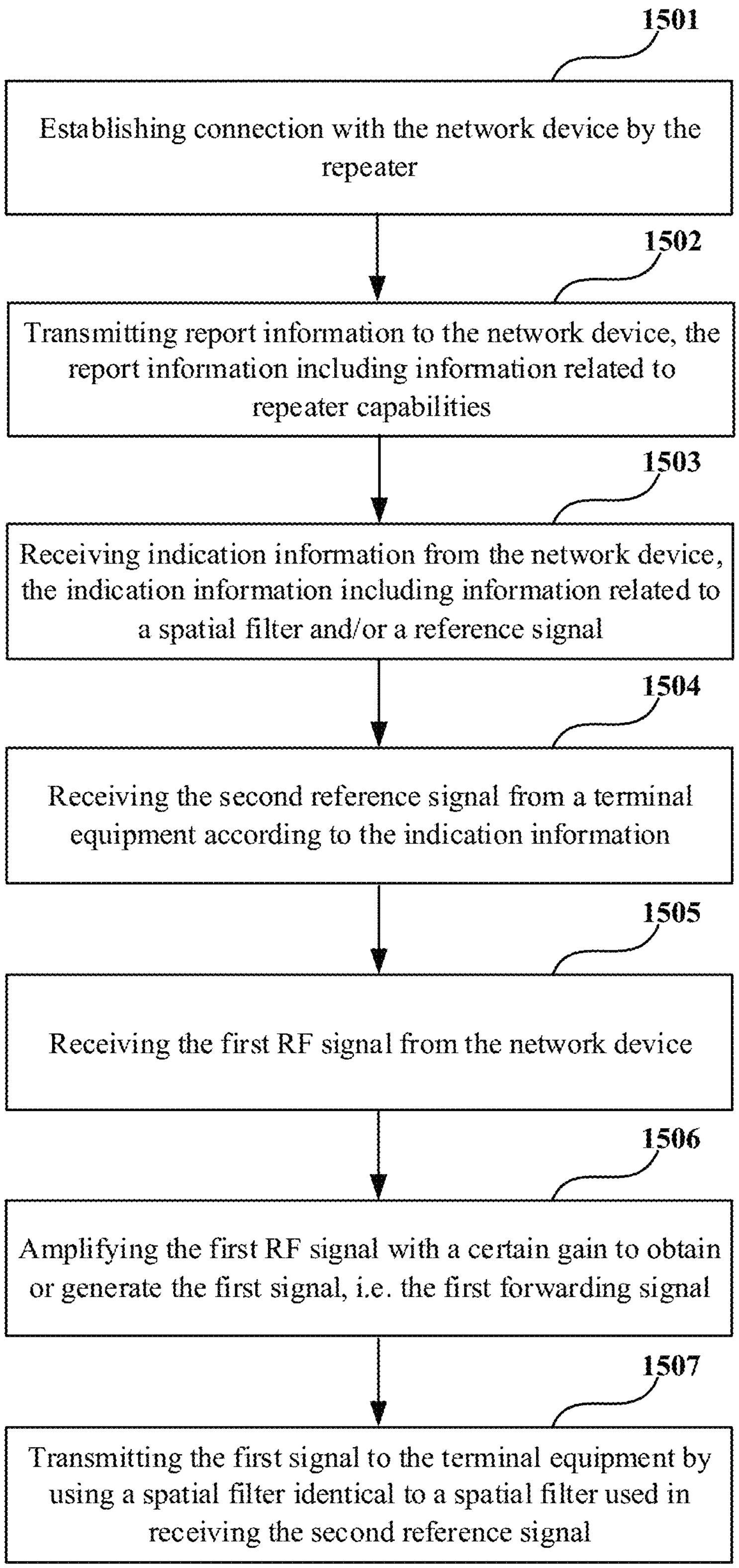
FIG. 15 is yet still another schematic diagram of the other implementation of the wireless communication method of embodiment 1 of this disclosure.

FIG. 15 is still another schematic diagram of further still another implementation of the wireless communication method in embodiment 1 of this disclosure. As shown in FIG. 15, the method includes:

step 1501: establishing connection with the network device by the repeater;

step 1502: transmitting report information to the network device, the report information including information related to repeater capabilities;

step 1503: receiving indication information from the network device, the indication information including information related to a spatial filter and/or a reference signal;

step 1504: receiving the second reference signal from a terminal equipment according to the indication information;

step 1505: receiving the first RF signal from the network device;

step 1506: amplifying the first RF signal with a certain gain to obtain or generate the first signal, i.e. the first forwarding signal; and step 1507: transmitting the first signal to the terminal equipment by using a spatial filter identical to a spatial filter used in receiving the second reference signal.

Figure 16:
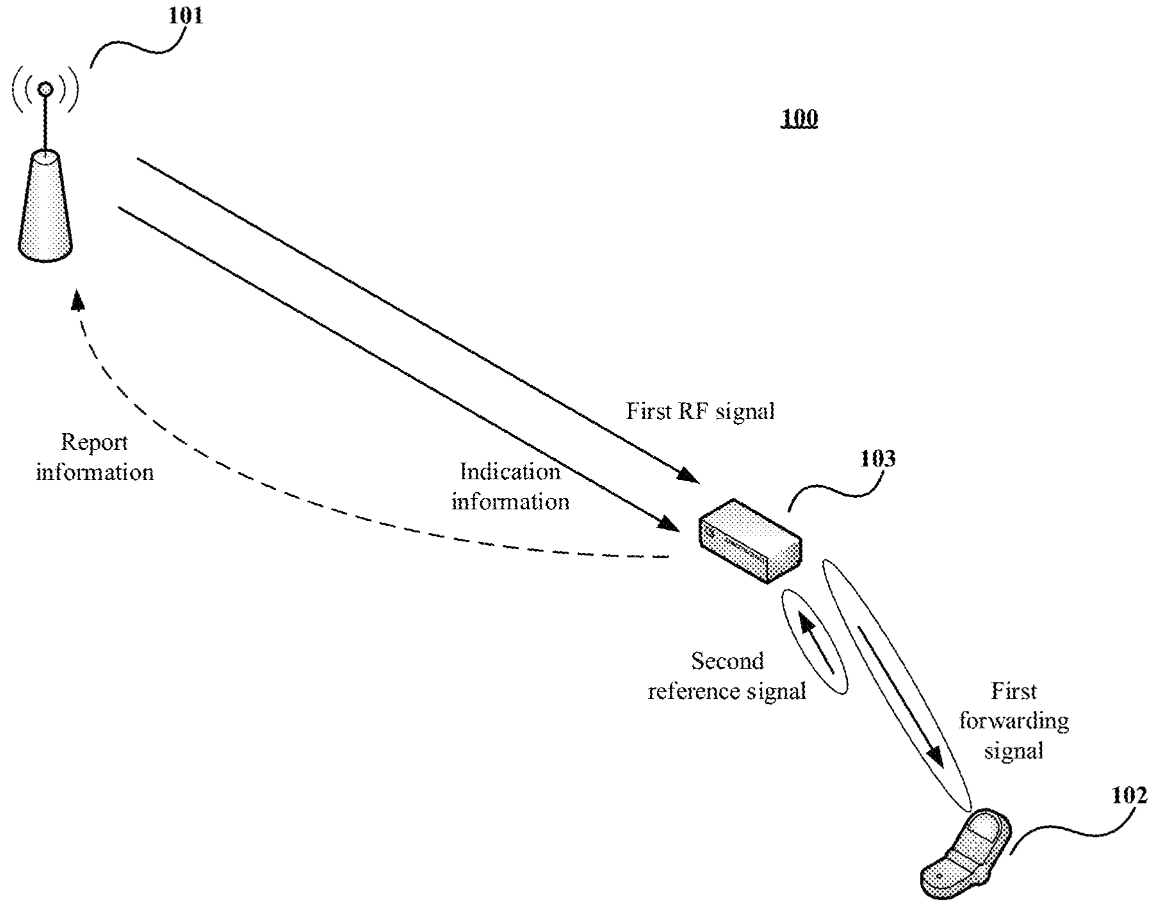
FIG. 16 is a schematic diagram of yet another implementation of the communication system of embodiment 1 of this disclosure.

The method shown in FIG. 15 shall be described below by way of an example. FIG. 16 is a schematic diagram of the still another implementation of the communication system in embodiment 1 of this disclosure.

As shown in FIG. 16, first, the repeater 103 establishes connection with the network device 101; then, the repeater 103 transmits report information to the network device 101; the network device 101 transmits indication information to the repeater 103; the third module of the repeater 103 receives the second reference signal from the terminal equipment 102 by using a spatial filter to which the indication corresponds; the repeater 103 receives the first RF signal from the network device 101 via the receiver at the network side and amplifies it with a certain gain to obtain the first signal, i.e. the first forwarding signal. Furthermore, the repeater 103 transmits the first forwarding signal to the terminal equipment 102 via the transmitter at the terminal side by using the spatial filter identical to the spatial filter used in receiving the second reference signal.

Figure 17:
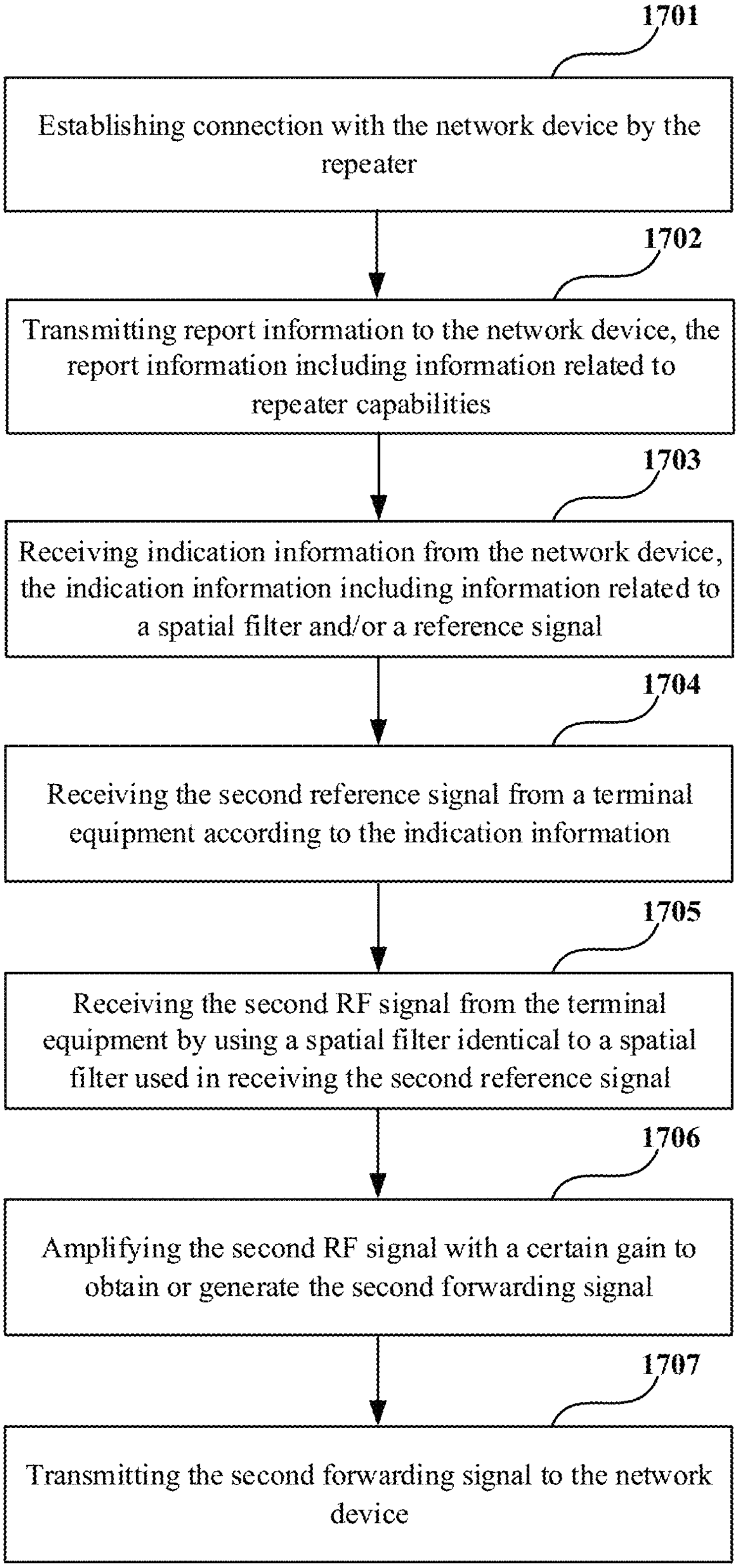
FIG. 17 is further still another schematic diagram of the other implementation of the wireless communication method of embodiment 1 of this disclosure.

FIG. 17 is further still another schematic diagram of yet still another implementation of the wireless communication method in embodiment 1 of this disclosure. As shown in FIG. 17, the method includes:

step 1701: establishing connection with the network device by the repeater;

step 1702: transmitting report information to the network device, the report information including information related to repeater capabilities;

step 1703: receiving indication information from the network device, the indication information including information related to a spatial filter and/or a reference signal;

step 1704: receiving the second reference signal from a terminal equipment according to the indication information;

step 1705: receiving the second RF signal from the terminal equipment by using a spatial filter identical to a spatial filter used in receiving the second reference signal;

step 1706: amplifying the second RF signal with a certain gain to obtain or generate the second forwarding signal; and step 1707: transmitting the second signal to the network device.

Figure 18:
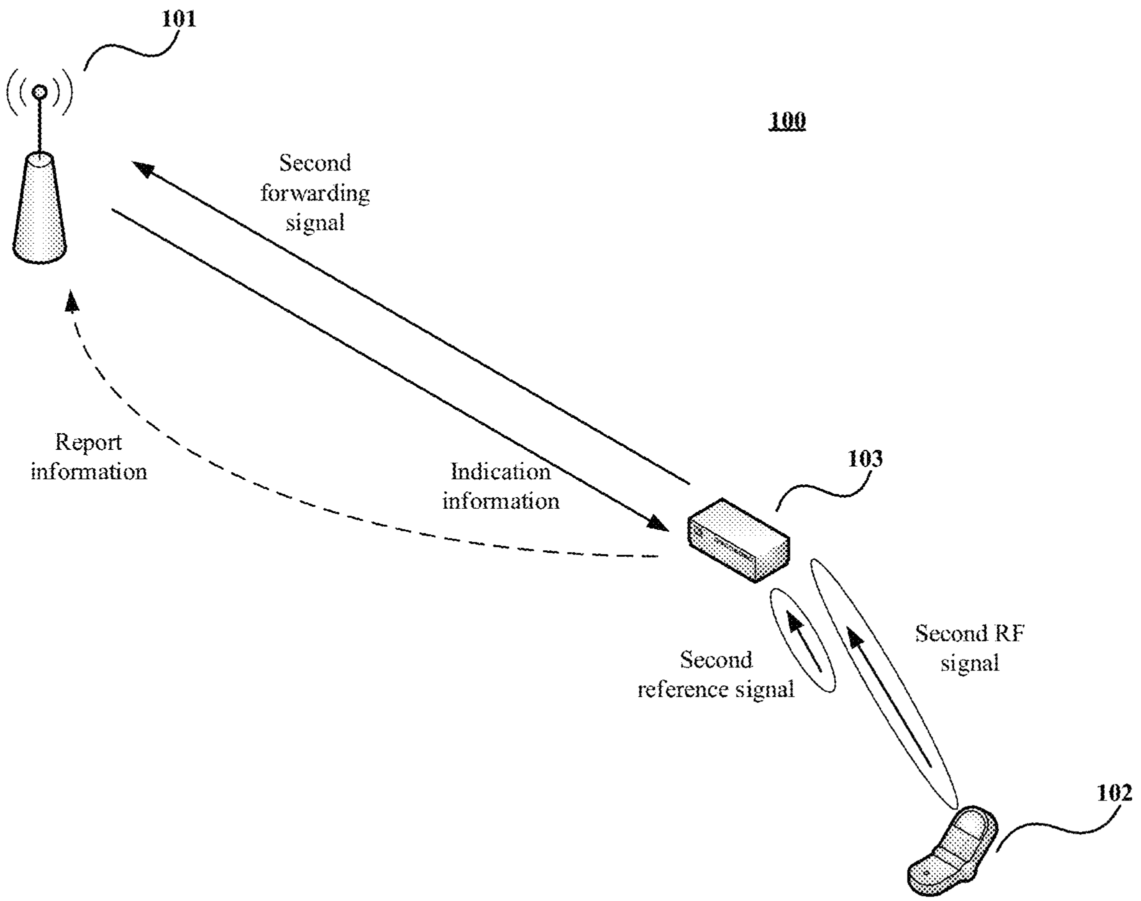
FIG. 18 is a schematic diagram of still another implementation of the communication system of embodiment 1 of this disclosure.

The method shown in FIG. 17 shall be described below by way of an example. FIG. 18 is a schematic diagram of the yet still another implementation of the communication system in embodiment 1 of this disclosure.

As shown in FIG. 18, first, the repeater 103 establishes connection with the network device 101; then, the repeater 103 transmits report information to the network device 101; the network device 101 transmits indication information to the repeater 103; the third module of the repeater 103 receives the second reference signal from the terminal equipment 102 by using a spatial filter to which the indication corresponds; the repeater 103 receives the second signal, i.e. the second RF signal, from the terminal equipment 102 by using the spatial filter identical to the spatial filter used in receiving the second reference signal, and amplifies the second signal with a certain gain to obtain the second forwarding signal. Furthermore, the repeater 103 transmits the second forwarding signal to the network device 101 via the transmitter at the network side.

Figure 19:
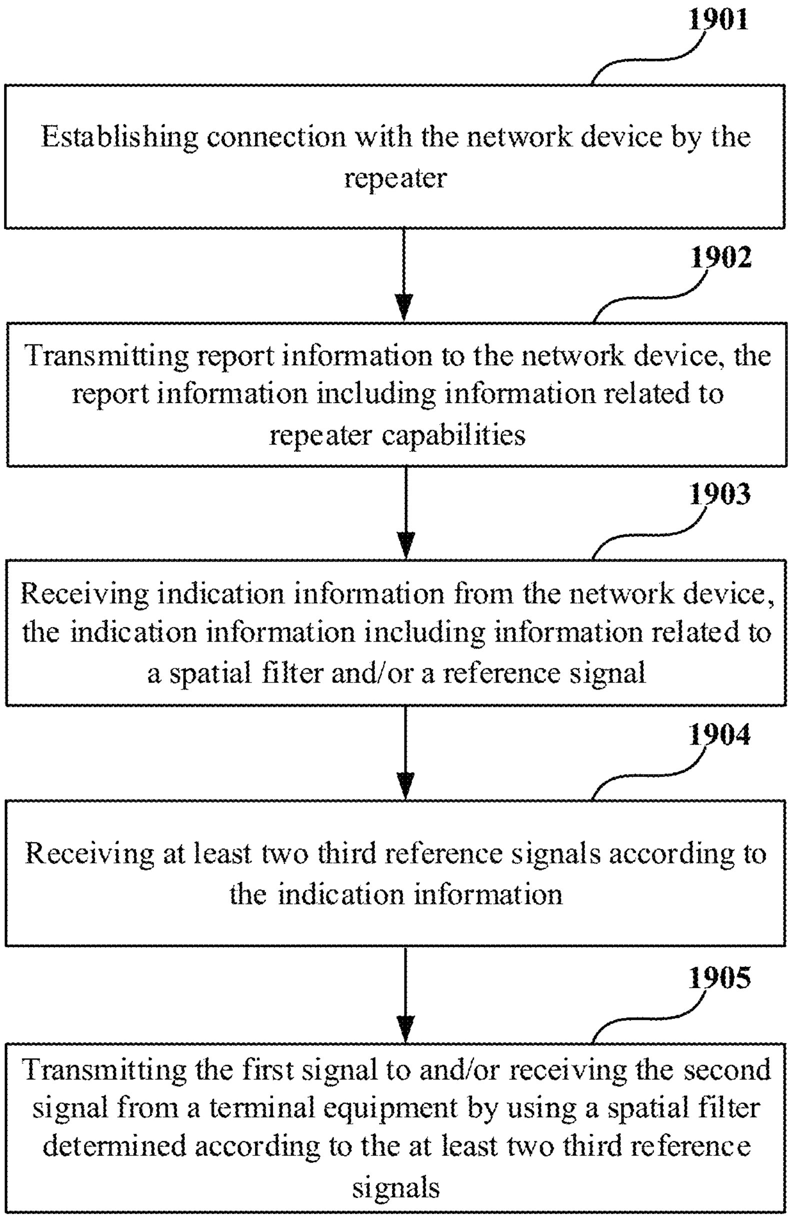
FIG. 19 is yet further still another schematic diagram of the other implementation of the wireless communication method of embodiment 1 of this disclosure.

FIG. 19 is yet still another schematic diagram of yet further still another implementation of the wireless communication method in embodiment 1 of this disclosure. As shown in FIG. 19, the method includes:

step 1901: establishing connection with the network device by the repeater;

step 1902: transmitting report information to the network device, the report information including information related to repeater capabilities;

step 1903: receiving indication information from the network device, the indication information including information related to a spatial filter and/or a reference signal;

step 1904: receiving at least two third reference signals according to the indication information; and step 1905: transmitting the first signal to and/or receiving the second signal from a terminal equipment by using a spatial filter determined according to the at least two third reference signals.

In step 1904, the received at least two third reference signals are from different terminal equipments.

In step 1905, the first signal is transmitted to the terminal equipment and/or the second signal is received from the terminal equipment by using the spatial filter determined according to the at least two third reference signals. A method for determining the spatial filter according to the at least two third reference signals is not limited In the embodiments of this disclosure.

Transmitting the first signal and receiving the second signal shall be respectively described below in detail.

Figure 20:
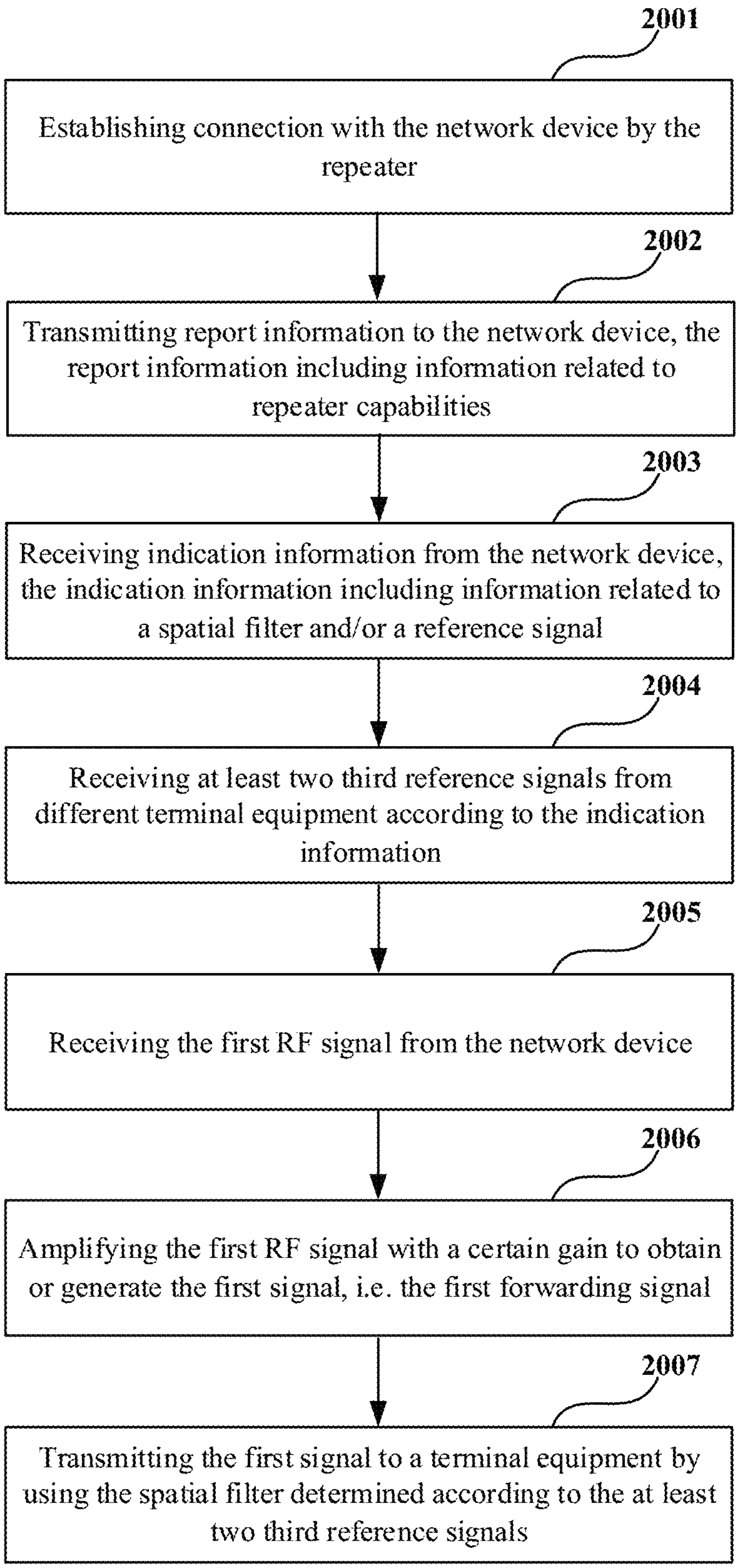
FIG. 20 is even another schematic diagram of the other implementation of the wireless communication method of embodiment 1 of this disclosure.

FIG. 20 is yet further still another schematic diagram of yet another implementation of the wireless communication method in embodiment 1 of this disclosure. As shown in FIG. 20, the method includes:

step 2001: establishing connection with the network device by the repeater;

step 2002: transmitting report information to the network device, the report information including information related to repeater capabilities;

step 2003: receiving indication information from the network device, the indication information including information related to a spatial filter and/or a reference signal;

step 2004: receiving at least two third reference signals from different terminal equipments according to the indication information;

step 2005: receiving the first RF signal from the network device;

step 2006: amplifying the first RF signal with a certain gain to obtain or generate the first signal, i.e. the first forwarding signal; and step 2007: transmitting the first signal to a terminal equipment by using the spatial filter determined according to the at least two third reference signals, such as transmitting the first signal to at least one of multiple terminal equipments.

Figure 21:
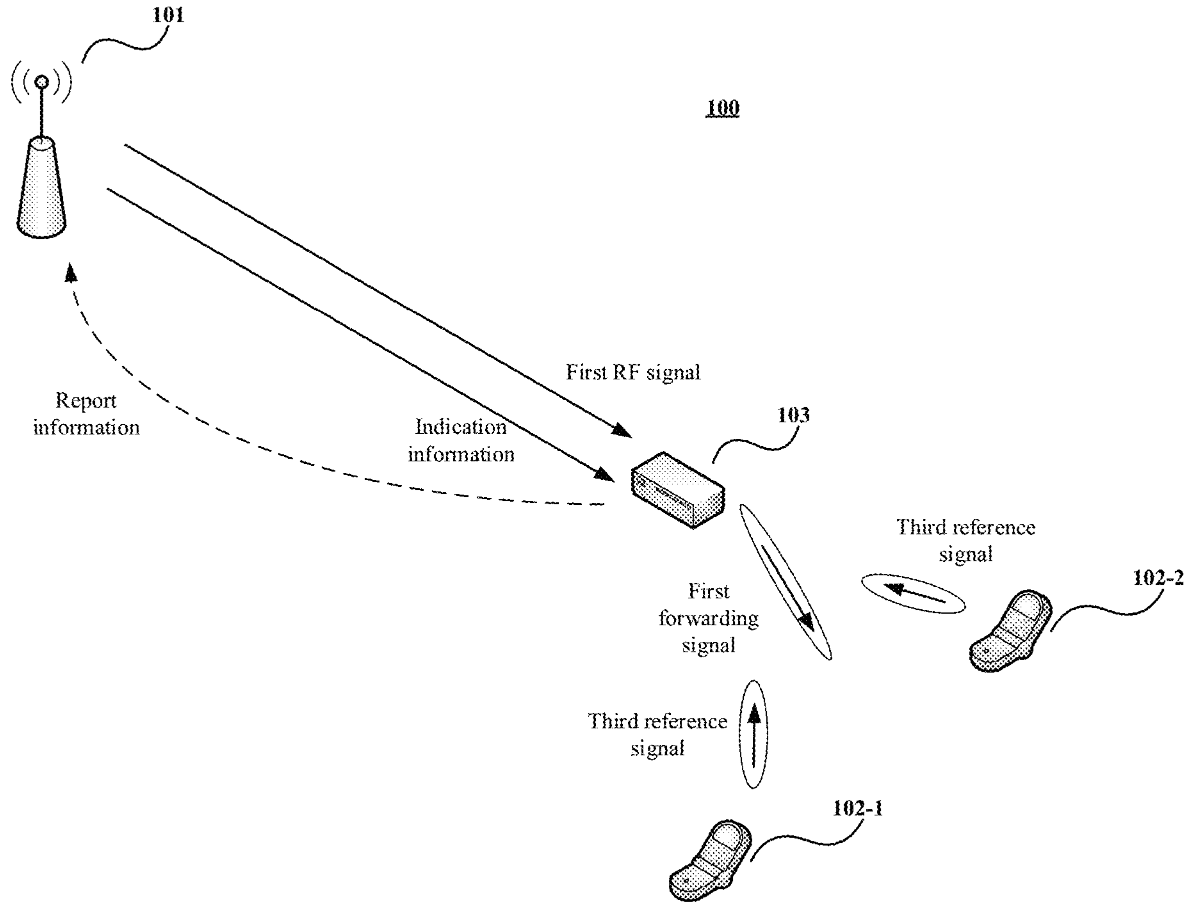
FIG. 21 is a schematic diagram of yet another implementation of the communication system of embodiment 1 of this disclosure.

The method shown in FIG. 20 shall be described below by way of an example. FIG. 21 is a schematic diagram of the yet another implementation of the communication system in embodiment 1 of this disclosure.

As shown in FIG. 21, first, the repeater 103 establishes connection with the network device 101; then, the repeater 103 transmits report information to the network device 101; the network device 101 transmits indication information to repeater 103; the third module of the repeater 103 receives third reference signals respectively from terminal equipments 102-1 and 102-2 by using the spatial filter to which the indication corresponds; the repeater 103 receives the first RF signal from the network device 101 via the receiver at the network side and amplifies it with a certain gain to obtain the first signal, i.e. the first forwarding signal. Furthermore, the repeater 103 transmits the first forwarding signal to at least one of the terminal equipments 102-1 and 102-2 via the transmitter at the terminal side by using the spatial filter determined according to the two third reference signals.

Figure 22:
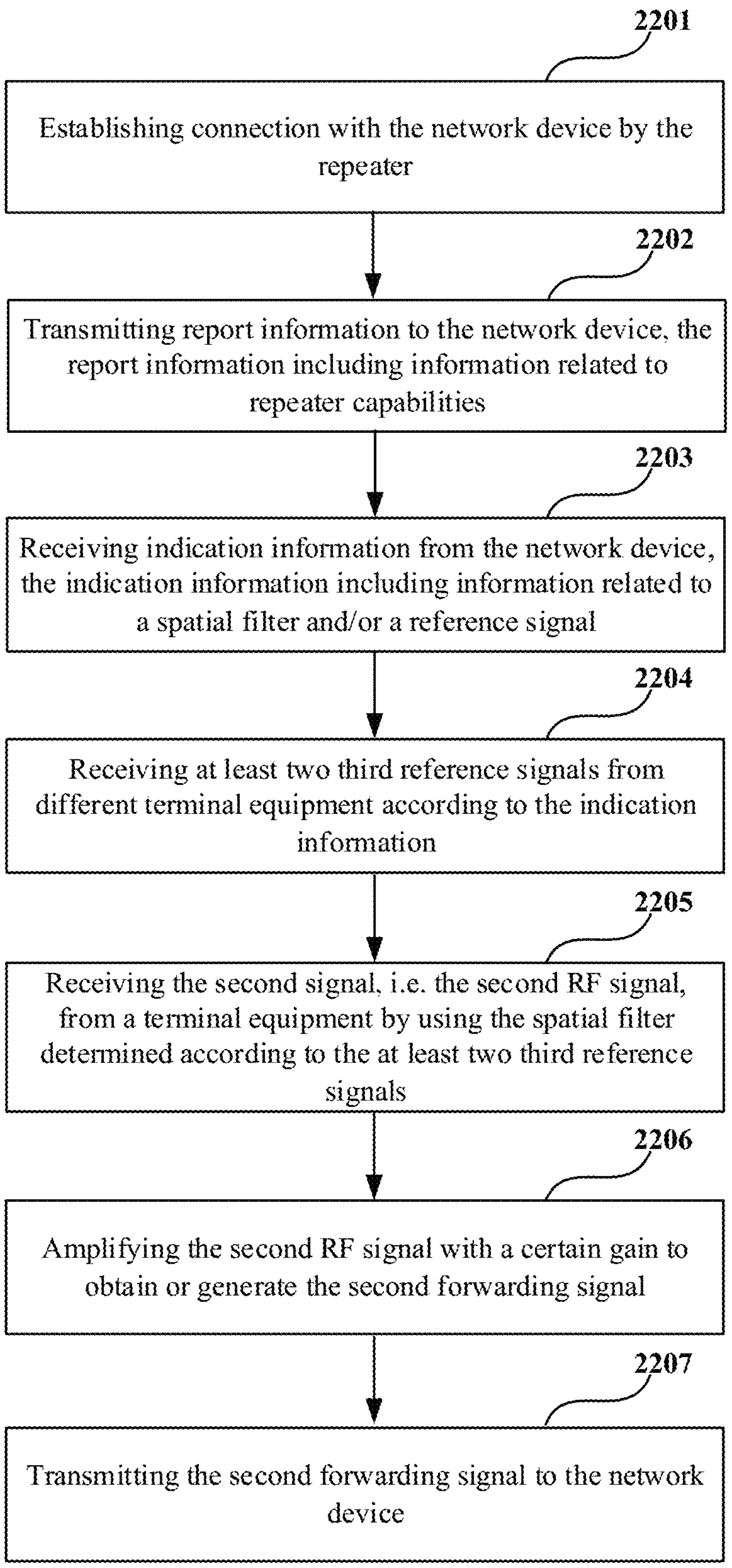
FIG. 22 is even further schematic diagram of the other implementation of the wireless communication method of embodiment 1 of this disclosure.

FIG. 22 is yet another schematic diagram of yet further another implementation of the wireless communication method in embodiment 1 of this disclosure. As shown in FIG. 22, the method includes:

step 2201: establishing connection with the network device by the repeater;

step 2202: transmitting report information to the network device, the report information including information related to repeater capabilities;

step 2203: receiving indication information from the network device, the indication information including information related to a spatial filter and/or a reference signal;

step 2204: receiving at least two third reference signals from different terminal equipments according to the indication information;

step 2205: receiving the second signal, i.e. the second RF signal, from a terminal equipment by using the spatial filter determined according to the at least two third reference signals;

step 2206: amplifying the second RF signal with a certain gain to obtain or generate the second forwarding signal; and step 2207: transmitting the second forwarding signal to the network device.

In step 2205, the second signal is from at least one of multiple terminal equipments.

Figure 23:
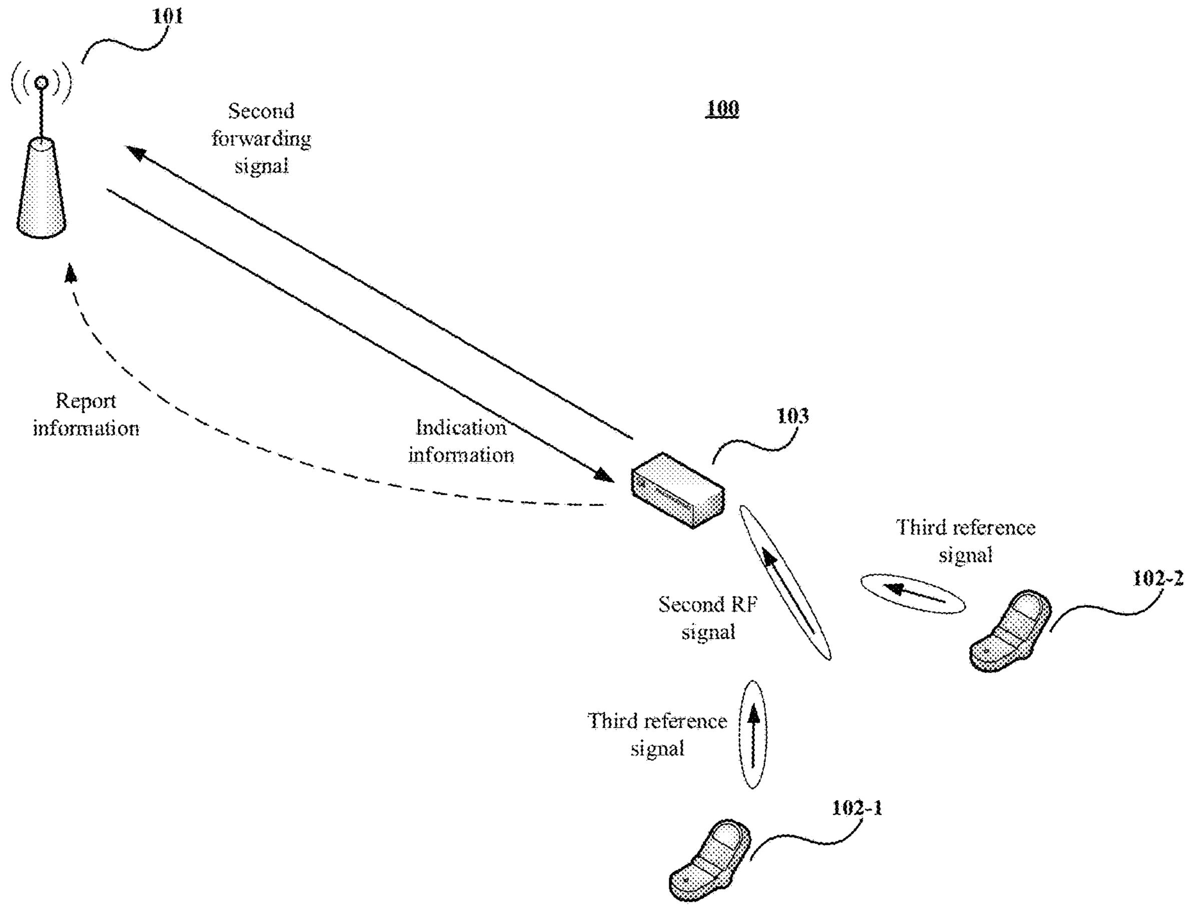
FIG. 23 is a schematic diagram of still another implementation of the communication system of embodiment 1 of this disclosure.

The method shown in FIG. 22 shall be described below by way of an example. FIG. 23 is a schematic diagram of yet another implementation of the communication system in embodiment 1 of this disclosure.

As shown in FIG. 23, first, the repeater 103 establishes connection with the network device 101; then, the repeater 103 transmits report information to the network device 101; the network device 101 transmits indication information to repeater 103; the third module of repeater 103 receives the second reference signal from two terminal equipments 102-1 and 102-2 respectively by using a spatial filter to which the indication corresponds; the repeater 103 receives the second signal, i.e. the second RF signal, from the terminal equipment 102 by using a spatial filter identical to the spatial filter used for receiving the second reference signal, and amplifies it with a certain gain to obtain the second forwarding signal. Furthermore, the repeater 103 transmits the second forwarding signal to the network device 101 via the transmitter at the network side.

It can be seen from the above embodiment that the repeater receives the indication information including the information related to a spatial filter and/or a reference signal from the network device, and according to the indication information, the repeater is able to receive and/or transmit signals to the network device and/or a terminal equipment by using a beamforming technology, and/or the repeater is able to receive and/or transmit reference signals to the network device and/or a terminal equipment, thereby using beamforming information of the reference signals in transmitting and/or receiving signals. Thus, gains of the repeater in transceiving signals may be enhanced, interference to neighboring cells may be avoided, and system performances may be improved.

Embodiment 2

Embodiment 2 of this disclosure provides a wireless communication method, applied to a network device side. This method corresponds to the wireless communication method at the repeater side in embodiment 1, with identical contents being not going to be repeated herein any further.

Figure 24:
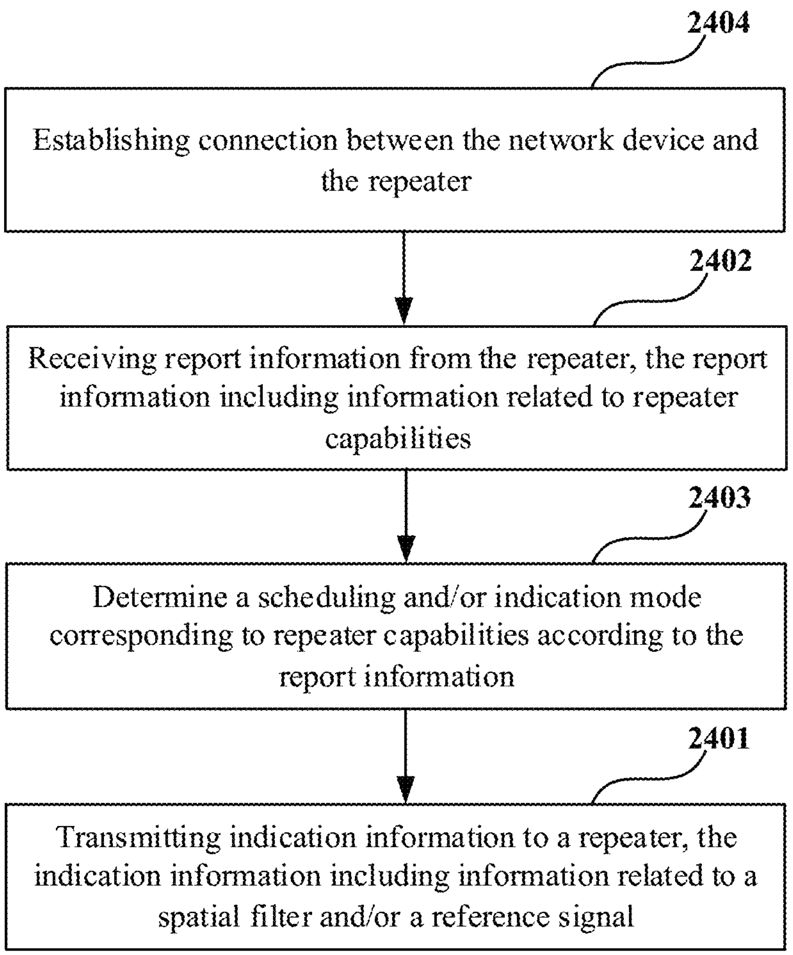
FIG. 24 is a schematic diagram of the wireless communication method of embodiment 2 of this disclosure.

FIG. 24 is a schematic diagram of the wireless communication method in embodiment 2 of this disclosure. As shown in FIG. 24, the method includes:

step 2401: transmitting indication information to a repeater, the indication information including information related to a spatial filter and/or a reference signal.

In the embodiments of this disclosure, the repeater is affiliated to a serving cell to which the network device corresponds.

In the embodiments of this disclosure, the indication information may refer to at least one piece of the following indication information: indication information used to indicate information related to a spatial filter and/or a reference signal used by the repeater in transmitting a first signal; indication information used to indicate information related to a spatial filter and/or a reference signal used by the repeater in receiving a second signal; indication information used to indicate that the repeater transmits a reference signal; and indication information used to indicate that the repeater receives a reference signal.

In the embodiments of this disclosure, the first signal is a first forwarding signal that forwards a signal received from the network device to a terminal equipment, and the second signal is a signal to be forwarded received from a terminal equipment.

In the embodiments of this disclosure, the indication information used to indicate that the repeater transmits a reference signal may include: indication information used to indicate information related to a spatial filter and/or a reference signal used by the repeater in transmitting a reference signal.

In the embodiments of this disclosure, the indication information used to indicate that the repeater receives a reference signal includes: indication information used to indicate information related to a spatial filter and/or a reference signal used by the repeater in receiving a reference signal.

In the embodiments of this disclosure, the information related to the spatial filter and/or the reference signal includes at least one piece of the following information: a spatial filter index and/or a beam index; a reference signal index; the number of antenna ports of a reference signal; antenna polarization information; beam width information; and beam direction information.

In the embodiments of this disclosure, the number of antenna ports of the reference signal is 1 or 2.

In the embodiments of this disclosure, the antenna polarization information includes single polarization or multi-polarization.

In the embodiments of this disclosure, the beam width information includes the number of antenna ports in a first dimension and the number of antenna ports in a second dimension.

In the embodiments of this disclosure, the beam direction information includes a codebook index.

In the embodiments of this disclosure, the codebook index corresponds to an exit angle or an antenna transmission phase.

In the embodiments of this disclosure, as shown in FIG. 24, the method further includes:

step 2402: receiving report information from the repeater, the report information including information related to repeater capabilities; and step 2403: determine a scheduling and/or indication mode corresponding to repeater capabilities according to the report information.

In the embodiments of this disclosure, the report information includes at least one piece of the following information: a maximum number of beams supported by the repeater; and antenna information of the repeater.

In the embodiments of this disclosure, the maximum number of beams supported by the repeater includes at least one of the following: a maximum number of candidate spatial filters or a maximum number of candidate beams, and a maximum number of candidate spatial filter reference signals or candidate beam reference signals.

In the embodiments of this disclosure, the maximum number of candidate spatial filter reference signals or candidate beam reference signals includes a maximum number of antenna ports of the candidate spatial filter reference signals or candidate beam reference signals.

In the embodiments of this disclosure, the antenna information of the repeater includes at least one of the following: antenna panel information, antenna polarization information, and antenna dimension information.

In the embodiments of this disclosure, as shown in FIG. 24, the method further includes: step 2404: establishing connection between the network device and the repeater.

In the embodiments of this disclosure, the repeater may be a relay device.

In the embodiments of this disclosure, the repeater may be a repeater node.

Reference may be made to what is described in embodiment 1 for implementation of the method, which shall not be specifically explained herein any further.

It can be seen from the above embodiment that a network device transmits the indication information including information related to a spatial filter and/or a reference signals to the repeater, hence, based on the indication information, the repeater may receive and/or transmit the signals to the network device and/or a terminal equipment by using beamforming technology, and/or the repeater is able to receive and/or transmit reference signals to the network device and/or a terminal equipment. Thus, the beamforming information of the reference signal may be utilized in transmitting and/or receiving signals, thereby enhancing gains of the repeater in transceiving signals, avoiding interference to neighboring cells, and improving system performances.

Embodiment 3

Embodiment 3 of this disclosure provides a wireless communication apparatus, applicable to a repeater. As a principle of the apparatus for solving problems is identical to that of the method in embodiment 1, reference may be made to the implementation of the method in embodiment 1 for implementation of the apparatus, with identical contents being not going to be repeated herein any further.

Figure 25:
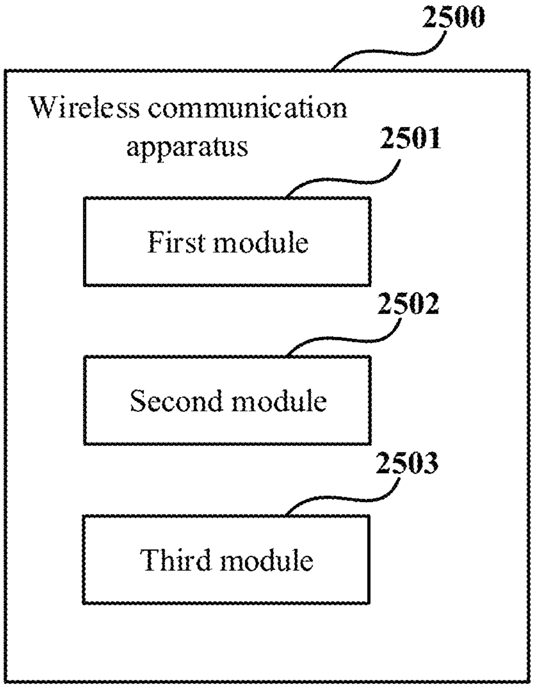
FIG. 25 is a schematic diagram of the wireless communication apparatus of embodiment 3 of this disclosure.

FIG. 25 is a schematic diagram of the wireless communication apparatus of embodiment 3 of this disclosure. As shown in FIG. 25, a wireless communication apparatus 2500 includes: a first module 2501 configured to receive indication information from a network device, the indication information including information related to a spatial filter and/or a reference signal.

In the embodiments of this disclosure, the first module 2501 is similar to a module of a terminal equipment, for example, the first module 2501 may also be referred to as a mobile terminal (MT) module.

In the embodiments of this disclosure, the repeater is affiliated to a serving cell to which the network device corresponds.

In the embodiments of this disclosure, the indication information refers to at least one piece of the following indication information: indication information used to indicate information related to a spatial filter and/or a reference signal used by the repeater in transmitting a first signal; indication information used to indicate information related to a spatial filter and/or a reference signal used by the repeater in receiving a second signal; indication information used to indicate that the repeater transmits a reference signal; and indication information used to indicate that the repeater receives a reference signal.

In the embodiments of this disclosure, the first signal is a first forwarding signal that forwards a signal received from the network device to a terminal equipment, and the second signal is a signal to be forwarded received from a terminal equipment.

In the embodiments of this disclosure, the indication information used to indicate that the repeater transmits a reference signal includes: indication information used to indicate information related to a spatial filter and/or a reference signal used by the repeater in transmitting a reference signal.

In the embodiments of this disclosure, the indication information used to indicate that the repeater receives a reference signal includes: indication information used to indicate information related to a spatial filter and/or a reference signal used by the repeater in receiving a reference signal.

In the embodiments of this disclosure, the information related to the spatial filter and/or the reference signal includes at least one piece of the following information: a spatial filter index and/or a beam index; a reference signal index; the number of antenna ports of a reference signal; antenna polarization information; beam width information; and beam direction information.

In the embodiments of this disclosure, the number of antenna ports of the reference signal is 1 or 2.

In the embodiments of this disclosure, the antenna polarization information includes single polarization or multi-polarization.

In the embodiments of this disclosure, the beam width information includes the number of antenna ports in a first dimension and the number of antenna ports in a second dimension.

In the embodiments of this disclosure, the beam direction information includes a codebook index.

In the embodiments of this disclosure, the codebook index corresponds to an exit angle or an antenna transmission phase.

In the embodiments of this disclosure, as shown in FIG. 25, the apparatus 2500 further includes:

a second module 2502 configured to transmit a first signal and/or receive a second signal by using a spatial filter to which the indication information corresponds.

In the embodiments of this disclosure, the second module 2502 may amplify a received analog signal with a certain gain, and then forwards the amplified signal. For example, the second module 2502 includes a transceiver at a network side, a transceiver at a terminal side, and a signal amplification circuit.

In the embodiments of this disclosure, the information related to the reference signal includes configuration information of the reference signal.

In the embodiments of this disclosure, as shown in FIG. 25, the apparatus 2500 further includes:

a third module 2503 configured to transmit and/or receive a reference signal according to the indication information.

In the embodiments of this disclosure, the third module is similar to a communication module of a network device, for example, the third module may also be referred to as a distributed unit (DU).

In the embodiments of this disclosure, the third module 2503 may transmit and/or receive the reference signal according to a spatial filter to which the indication information corresponds.

In the embodiments of this disclosure, the third module 2503 may transmit a first reference signal to a terminal equipment according to the indication information.

In the embodiments of this disclosure, the apparatus may further include:

a fourth module configured to transmit the first signal to a terminal equipment and/or receive a second signal from a terminal equipment by using a spatial filter determined according to the first reference signal.

For example, the fourth module and the second module 2502 may be the same module.

For example, the fourth module transmits the first signal to the terminal equipment and/or receives the second signal from the terminal equipment by using a spatial filter identical to the spatial filter used in transmitting the first reference signal.

In the embodiments of this disclosure, the third module 2503 may receive a second reference signal from a terminal equipment according to the indication information.

In the embodiments of this disclosure, the apparatus may further include:

a fifth module configured to transmit the first signal to a terminal equipment and/or receive the second signal from a terminal equipment by using a spatial filter determined according to the second reference signal.

For example, the fifth module and the second module 2502 may be the same module.

For example, the fifth module transmits the first signal to the terminal equipment and/or receive the second signal from the terminal equipment by using the spatial filter used in receiving the second reference signal.

In the embodiments of this disclosure, the third module 2503 may receive at least two third reference signals according to the indication information.

For example, the at least two third reference signals are from different terminal equipments.

In the embodiments of this disclosure, the apparatus may further include:

a sixth module configured to transmit the first signal to a terminal equipment and/or receive the second signal from a terminal equipment according to the at least two third reference signals.

For example, the sixth module and the second module 2502 may be the same module.

In the embodiments of this disclosure, the reference signal corresponds to downlink transmission from the repeater to terminal equipments.

In the embodiments of this disclosure, the reference signal is used for communication with terminal equipments.

In the embodiments of this disclosure, the reference signal includes at least one of an SSB, an SRS, a CSI-RS and a repeater-specific reference signal.

In the embodiments of this disclosure, the apparatus may further include:

a seventh module configured to transmit report information to the network device, the report information including information related to repeater capabilities.

For example, the seventh module and the first module 2501 may be the same module.

In the embodiments of this disclosure, the report information is used for the network device to determine a scheduling and/or indication mode corresponding to repeater capabilities.

In the embodiments of this disclosure, the report information includes at least one piece of the following information: a maximum number of beams supported by the repeater; and antenna information of the repeater.

In the embodiments of this disclosure, the maximum number of beams supported by the repeater includes at least one of the following: a maximum number of candidate spatial filters or a maximum number of candidate beams, and a maximum number of candidate spatial filter reference signals or a maximum number of candidate beam reference signals.

For example, the maximum number of candidate spatial filter reference signals or candidate beam reference signals includes a maximum number of antenna ports for candidate spatial filter reference signals or a maximum number of antenna ports for candidate beam reference signals.

For example, the antenna information of the repeater includes at least one of the following: antenna panel information, antenna polarization information, and antenna dimension information.

In the embodiments of this disclosure, the apparatus may further include:

an eighth module configured to establish connection with the network device.

For example, the eighth module and the first module 2501 may be the same module.

For example, the repeater is a relay device.

For example, the repeater is a repeater node.

It can be seen from the above embodiment that the repeater receives the indication information including the information related to a spatial filter and/or a reference signal from the network device, and according to the indication information, the repeater is able to receive and/or transmit signals to the network device and/or a terminal equipment by using a beamforming technology, and/or the repeater is able to receive and/or transmit reference signals to the network device and/or a terminal equipment, thereby using beamforming information of the reference signals in transmitting and/or receiving signals. Thus, gains of the repeater in transceiving signals may be enhanced, interference to neighboring cells may be avoided, and system performances may be improved.

Embodiment 4

Embodiment 4 of this disclosure provides a wireless communication apparatus, applicable to a network device side. As a principle of the apparatus for solving problems is identical to that of the method in embodiment 2, reference may be made to the implementation of the method in embodiment 2 for implementation of the apparatus, with identical contents being not going to be repeated herein any further.

Figure 26:
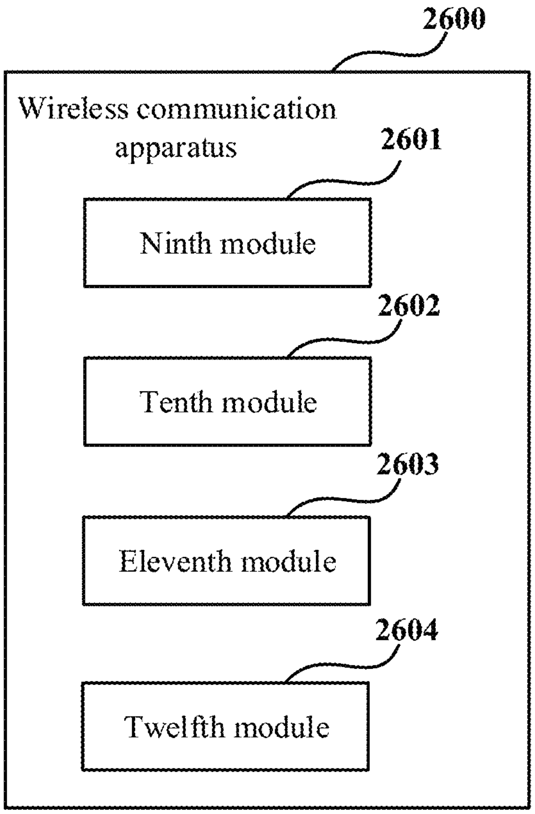
FIG. 26 is a schematic diagram of the wireless communication apparatus of embodiment 4 of this disclosure.

FIG. 26 is a schematic diagram of the wireless communication apparatus of embodiment 4 of this disclosure. As shown in FIG. 26, a wireless communication apparatus 2600 includes: a ninth module 2601 configured to transmit indication information to a repeater, the indication information including information related to a spatial filter and/or a reference signal.

In the embodiments of this disclosure, the repeater is affiliated to a serving cell to which the network device corresponds.

In the embodiments of this disclosure, the indication information may refer to at least one piece of the following indication information: indication information used to indicate information related to a spatial filter and/or a reference signal used by the repeater in transmitting a first signal; indication information used to indicate information related to a spatial filter and/or a reference signal used by the repeater in receiving a second signal; indication information used to indicate that the repeater transmits a reference signal; and indication information used to indicate that the repeater receives a reference signal.

In the embodiments of this disclosure, the first signal is a first forwarding signal that forwards a signal received from the network device to a terminal equipment, and the second signal is a signal to be forwarded received from a terminal equipment.

In the embodiments of this disclosure, the indication information used to indicate that the repeater transmits a reference signal may include: indication information used to indicate information related to a spatial filter and/or a reference signal used by the repeater in transmitting a reference signal.

In the embodiments of this disclosure, the indication information used to indicate that the repeater receives a reference signal includes: indication information used to indicate information related to a spatial filter and/or a reference signal used by the repeater in receiving a reference signal.

In the embodiments of this disclosure, the information related to the spatial filter and/or the reference signal includes at least one piece of the following information: a spatial filter index and/or a beam index; a reference signal index; the number of antenna ports of a reference signal; antenna polarization information; beam width information; and beam direction information.

In the embodiments of this disclosure, the number of antenna ports of the reference signal is 1 or 2.

In the embodiments of this disclosure, the antenna polarization information includes single polarization or multi-polarization.

In the embodiments of this disclosure, the beam width information includes the number of antenna ports in a first dimension and the number of antenna ports in a second dimension.

In the embodiments of this disclosure, the beam direction information includes a codebook index.

In the embodiments of this disclosure, the codebook index corresponds to an exit angle or an antenna transmission phase.

In the embodiments of this disclosure, as shown in FIG. 26, the apparatus 2600 further includes:

- a tenth module 2602 configured to receive report information from the repeater, the report information including information related to repeater capabilities.

In the embodiments of this disclosure, as shown in FIG. 26, the apparatus 2600 further includes:

- an eleventh module 2603 configured to determine a scheduling and/or indication mode corresponding to repeater capabilities according to the report information.

In the embodiments of this disclosure, the report information includes at least one piece of the following information: a maximum number of beams supported by the repeater; and antenna information of the repeater.

In the embodiments of this disclosure, the maximum number of beams supported by the repeater includes at least one of the following: a maximum number of candidate spatial filters or a maximum number of candidate beams, and a maximum number of candidate spatial filter reference signals or candidate beam reference signals.

In the embodiments of this disclosure, the maximum number of candidate spatial filter reference signals or candidate beam reference signals includes a maximum number of antenna ports of the candidate spatial filter reference signals or candidate beam reference signals.

In the embodiments of this disclosure, the antenna information of the repeater includes at least one of the following: antenna panel information, antenna polarization information, and antenna dimension information.

In the embodiments of this disclosure, as shown in FIG. 26, the apparatus 2600 further includes:

- a twelfth module 2604 configured to establish connection with the repeater.

For example, the repeater is a relay device.

For example, the repeater is a repeater node.

It can be seen from the above embodiment that the network device transmits the indication information including information related to a spatial filter and/or a reference signals to the repeater, hence, based on the indication information, the repeater may receive and/or transmit the signals to the network device and/or the terminal equipment by using beamforming technology, and/or the repeater is able to receive and/or transmit reference signals to the network device and/or the terminal equipment. Thus, the beamforming information of the reference signal may be utilized in transmitting and/or receiving signals, thereby enhancing gains of the repeater in transceiving signals, avoiding interference to neighboring cells, and improving system performances.

Embodiment 5

Embodiment 5 of this disclosure provides a repeater, including the wireless communication apparatus as described in embodiment 3.

Figure 27:
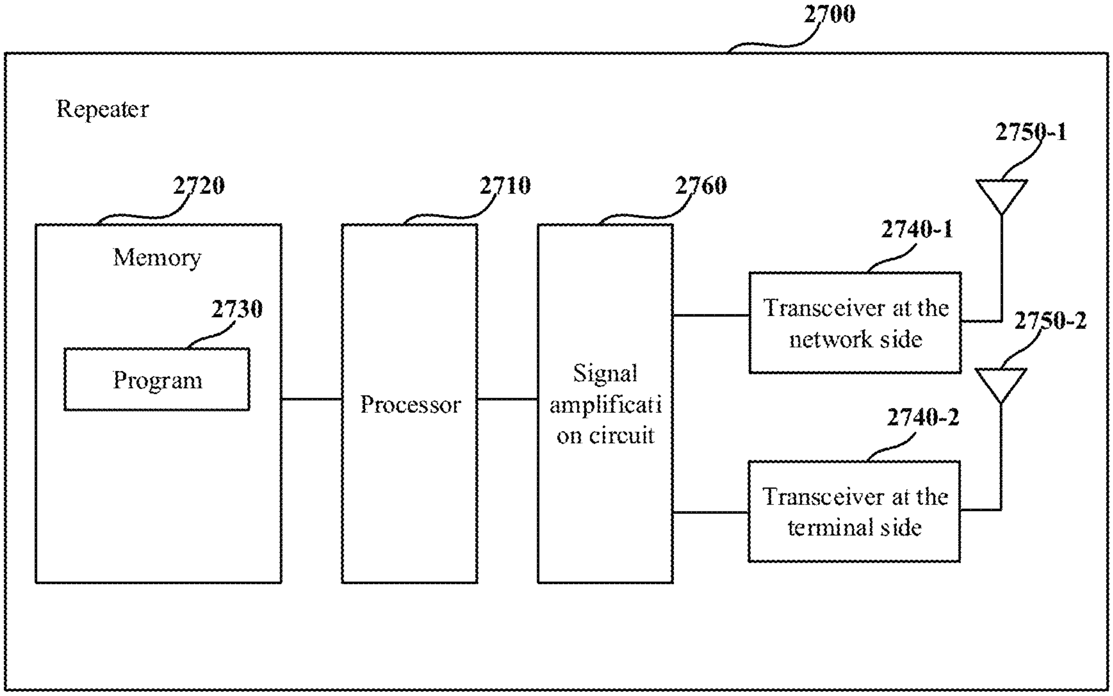
FIG. 27 is a block diagram of a systematic structure of the repeater of embodiment 5 of this disclosure.

FIG. 27 is a block diagram of a systematic structure of the repeater in embodiment 5 of this disclosure. As shown in FIG. 27, a repeater 2700 may include a processor 2710 and a memory 2720, the memory 2720 being coupled to the processor 2710. It should be noted that this figure is illustrative only, and other types of structures may also be used, so as to supplement or replace this structure and achieve a telecommunications function or other functions.

In one implementation, the functions of the the wireless communication apparatus may be integrated into the processor 2710. Wherein, the processor 2710 may be configured to receive indication information from a network device, the indication information including information related to a spatial filter and/or a reference signal.

In another implementation, the wireless communication apparatus and the processor 2710 may be configured separately; for example, the wireless communication apparatus may be configured as a chip connected to the processor 2710, and the functions of the wireless communication apparatus are executed under control of the processor 2710.

As shown in FIG. 27, the repeater 2700 may further include a transceiver 2740-1 at the network side and an antenna 2750-1 at the network side, a transceiver 2740-2 at the terminal side and an antenna 2750-2 at the terminal side, and a signal amplification circuit 2760, etc. Wherein, functions of the above components are similar to those in the prior art, and shall not be described herein any further. It should be noted that the repeater 2700 does not necessarily include all the parts shown in FIG. 27. Furthermore, the repeater 2700 may include parts not shown in FIG. 27, and the prior art may be referred to.

As shown in FIG. 27, the processor 2710 is sometimes referred to as a controller or an operational control, which may include a microprocessor or other processor devices and/or logic devices. The processor 2710 receives input and controls operations of components of the repeater 2700.

Wherein, the memory 2720 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2710 may execute programs stored in the memory 2720, so as to realize information storage or processing, etc. Functions of other parts are similar to those of the prior art, which shall not be described herein any further. The parts of the repeater 2700 may be realized by specific hardware, firmware, software, or any combination thereof, without departing from the scope of this disclosure.

It can be seen from the above embodiment that the repeater receives the indication information including the information related to a spatial filter and/or a reference signal from the network device, and according to the indication information, the repeater is able to receive and/or transmit signals to the network device and/or a terminal equipment by using a beamforming technology, and/or the repeater is able to receive and/or transmit reference signals to the network device and/or a terminal equipment, thereby using beamforming information of the reference signals in transmitting and/or receiving signals. Thus, gains of the repeater in transceiving signals may be enhanced, interference to neighboring cells may be avoided, and system performances may be improved.

Embodiment 6

The embodiment of this disclosure provides a network device, including the wireless communication apparatus as described in embodiment 4.

Figure 28:
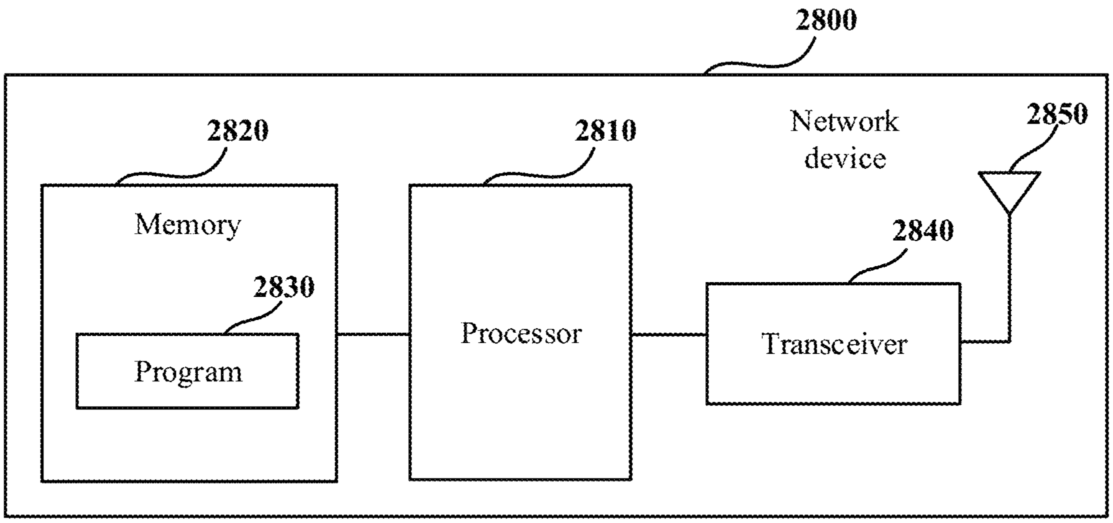
FIG. 28 is a block diagram of a systematic structure of the network device of embodiment 6 of this disclosure.

FIG. 28 is a schematic diagram of a systematic structure of the network device of embodiment 6 of this disclosure. As shown in FIG. 28, a network device 2800 may include a processor 2810 and a memory 2820, the memory 2820 being coupled to the processor 2810.

Wherein, the memory 2820 may store various data, and furthermore, it may store a program 2830 for data processing, and execute the program 2830 under control of the processor 2810, so as to receive various information transmitted by a repeater, and transmit various information to the repeater.

In one implementation, the functions of the wireless communication apparatus may be integrated into the processor 2810. Wherein, the processor 2810 may be configured to transmit indication information to the repeater, the indication information including information related to a spatial filter and/or a reference signal.

Furthermore, as shown in FIG. 28, the network device 2800 may include a transceiver 2840, and an antenna 2850, etc. Wherein, functions of the above components are similar to those in the prior art, and shall not be described herein any further. It should be noted that the network device 2800 does not necessarily include all the parts shown in FIG. 28. Furthermore, the network device 2800 may include parts not shown in FIG. 28, and the prior art may be referred to.

It can be seen from the above embodiment that the network device transmits the indication information including information related to a spatial filter and/or a reference signals to the repeater, hence, based on the indication information, the repeater may receive and/or transmit the signals to the network device and/or the terminal equipment by using beamforming technology, and/or the repeater is able to receive and/or transmit reference signals to the network device and/or the terminal equipment. Thus, the beamforming information of the reference signal may be utilized in transmitting and/or receiving signals, thereby enhancing gains of the repeater in transceiving signals, avoiding interference to neighboring cells, and improving system performances.

Embodiment 7

The embodiment of this disclosure provides a communication system, including the repeater described in embodiment 5 and/or the network device described in embodiment 6.

For example, reference may be made to FIG. 1 for a structure of the communication system. As shown in FIG. 1, the communication system 100 includes a network device 101, a terminal equipment 102 and a repeater 103. The repeater 103 may be identical to the repeater described in embodiment 5, and the network device 101 may be identical to the network device described in embodiment 6, with repeated parts being not going to be described herein any further.

It can be seen from the above embodiment that the network device transmits the indication information including information related to a spatial filter and/or a reference signals to the repeater, hence, based on the indication information, the repeater may receive and/or transmit the signals to the network device and/or the terminal equipment by using beamforming technology, and/or the repeater is able to receive and/or transmit reference signals to the network device and/or the terminal equipment. Thus, the beamforming information of the reference signal may be utilized in transmitting and/or receiving signals, thereby enhancing gains of the repeater in transceiving signals, avoiding interference to neighboring cells, and improving system performances.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 25 may either correspond to software modules of procedures of a computer program, or correspond to hardware modules. Such software modules may respectively correspond to the steps shown in FIG. 2 and FIG. 3. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 25 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 25 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to the implementations including the above embodiments, following supplements are further disclosed.

Supplement I

1. A wireless communication apparatus, applicable to a repeater, the apparatus including:

a first module configured to receive indication information from a network device, the indication information including information related to a spatial filter and/or a reference signal.

2. The apparatus according to supplement 1, wherein, the repeater is affiliated to a serving cell to which the network device corresponds.

3. The apparatus according to supplement 1, wherein the indication information refers to at least one piece of the following indication information:

indication information used to indicate information related to a spatial filter and/or a reference signal used by the repeater in transmitting a first signal;

indication information used to indicate information related to a spatial filter and/or a reference signal used by the repeater in receiving a second signal;

indication information used to indicate that the repeater transmits a reference signal; and indication information used to indicate that the repeater receives a reference signal.

4. The apparatus according to supplement 3, wherein, the first signal is a first forwarding signal that forwards a signal received from the network device to a terminal equipment;

and the second signal is a signal to be forwarded received from the network device, or the second signal is a signal to be forwarded received from a terminal equipment.

5. The apparatus according to supplement 3, wherein, the indication information used to indicate that the repeater transmits a reference signal includes:

indication information used to indicate information related to a spatial filter and/or a reference signal used by the repeater in transmitting a reference signal.

6. The apparatus according to supplement 3, wherein, the indication information used to indicate that the repeater receives a reference signal includes:

indication information used to indicate information related to a spatial filter and/or a reference signal used by the repeater in receiving a reference signal.

7. The apparatus according to any one of supplements 1-6, wherein, the information related to the spatial filter and/or the reference signal includes at least one piece of the following information:

a spatial filter index and/or a beam index;

a reference signal index;

the number of antenna ports of a reference signal;

antenna polarization information;

beam width information; and beam direction information.

8. The apparatus according to supplement 7, wherein, the number of antenna ports of the reference signal is 1 or 2.

9. The apparatus according to supplement 7, wherein, the antenna polarization information includes single polarization or multi-polarization.

10. The apparatus according to supplement 7, wherein, the beam width information includes the number of antenna ports in a first dimension and the number of antenna ports in a second dimension.

11. The apparatus according to supplement 7, wherein, the beam direction information includes a codebook index.

12. The apparatus according to supplement 11, wherein, the codebook index corresponds to an exit angle or an antenna transmission phase.

13. The apparatus according to any one of supplements 1-12, wherein the apparatus further includes:

a second module configured to transmit a first signal and/or receive a second signal by using a spatial filter to which the indication information corresponds.

14. The apparatus according to supplement 1, wherein, the information related to the reference signal includes configuration information of the reference signal.

15. The apparatus according to any one of supplements 1-12 and 14, wherein the apparatus further includes:

a third module configured to transmit and/or receive a reference signal according to the indication information.

16. The apparatus according to supplement 15, wherein, the third module transmits and/or receives the reference signal according to a spatial filter to which the indication information corresponds.

17. The apparatus according to supplement 15 or 16, wherein, the third module transmits a first reference signal to a terminal equipment according to the indication information.

18. The apparatus according to supplement 17, wherein the apparatus further includes:

a fourth module configured to transmit the first signal to the terminal equipment and/or receive a second signal from the terminal equipment by using a spatial filter determined according to the first reference signal.

19. The apparatus according to supplement 18, wherein, the fourth module transmits the first signal to the terminal equipment and/or receives the second signal from the terminal equipment by using a spatial filter identical to the spatial filter used in transmitting the first reference signal.

20. The apparatus according to supplement 15 or 16, wherein, the third module receives a second reference signal from a terminal equipment according to the indication information.

21. The apparatus according to supplement 20, wherein the apparatus further includes:

a fifth module configured to transmit the first signal to the terminal equipment and/or receive the second signal from the terminal equipment by using a spatial filter determined according to the second reference signal.

22. The apparatus according to supplement 21, wherein, the fifth module transmits the first signal to the terminal equipment and/or receive the second signal from the terminal equipment by using the spatial filter used in receiving the second reference signal.

23. The apparatus according to supplement 15 or 16, wherein, the third module receives at least two third reference signals according to the indication information.

24. The apparatus according to supplement 23, wherein the at least two third reference signals are from different terminal equipments.

25. The apparatus according to supplement 23 or 24, wherein the apparatus further includes:

a sixth module configured to transmit the first signal to a terminal equipment and/or receive the second signal from a terminal equipment according to the at least two third reference signals.

26. The apparatus according to supplement 15 or 16, wherein, the reference signal corresponds to downlink transmission from the repeater to terminal equipments.

27. The apparatus according to supplement 15 or 16, wherein, the reference signal is used for communication with terminal equipments.

28. The apparatus according to supplement 15 or 16, wherein, the reference signal includes at least one of an SSB, an SRS, a CSI-RS and a repeater-specific reference signal.

29. The apparatus according to any one of supplements 1-28, wherein the apparatus further includes:

a seventh module configured to transmit report information to the network device, the report information including information related to repeater capabilities.

30. The apparatus according to supplement 29, wherein, the report information is used for the network device to determine a scheduling and/or indication mode corresponding to repeater capabilities.

31. The apparatus according to supplement 29 or 30, wherein, the report information includes at least one piece of the following information:

a maximum number of beams supported by the repeater; and antenna information of the repeater.

32. The apparatus according to supplement 31, wherein, the maximum number of beams supported by the repeater includes at least one of the following:

a maximum number of candidate spatial filters or a maximum number of candidate beams; and a maximum number of candidate spatial filter reference signals or a maximum number of candidate beam reference signals.

33. The apparatus according to supplement 32, wherein, the maximum number of candidate spatial filter reference signals or candidate beam reference signals includes a maximum number of antenna ports for candidate spatial filter reference signals or a maximum number of antenna ports for candidate beam reference signals.

34. The apparatus according to supplement 31, wherein, the antenna information of the repeater includes at least one of the following:

antenna panel information;

antenna polarization information; and antenna dimension information.

35. The apparatus according to any one of supplements 1-34, wherein the apparatus further includes:

an eighth module configured to establish connection with the network device.

36. The apparatus according to any one of supplements 1-35, wherein, the repeater is a relay device.

37. The apparatus according to any one of supplements 1-36, wherein, the repeater is a repeater node.

38. A wireless communication apparatus, applicable to a network device, the apparatus including:

a ninth module configured to transmit indication information to a repeater, the indication information including information related to a spatial filter and/or a reference signal.

39. The apparatus according to supplement 38, wherein, the repeater is affiliated to a serving cell to which the network device corresponds.

40. The apparatus according to supplement 38, wherein, the indication information may refer to at least one piece of the following indication information:

indication information used to indicate information related to a spatial filter and/or a reference signal used by the repeater in transmitting a first signal;

indication information used to indicate information related to a spatial filter and/or a reference signal used by the repeater in receiving a second signal;

indication information used to indicate that the repeater transmits a reference signal; and indication information used to indicate that the repeater receives a reference signal.

41. The apparatus according to supplement 40, wherein, the first signal is a first forwarding signal that forwards a signal received from the network device to a terminal equipment, and the second signal is a signal to be forwarded received from a terminal equipment.

42. The apparatus according to supplement 40, wherein, the indication information used to indicate that the repeater transmits a reference signal includes:

indication information used to indicate information related to a spatial filter and/or a reference signal used by the repeater in transmitting a reference signal.

43. The apparatus according to supplement 40, wherein, the indication information used to indicate that the repeater receives a reference signal includes:

indication information used to indicate information related to a spatial filter and/or a reference signal used by the repeater in receiving a reference signal.

44. The apparatus according to any one of supplements 38-43, wherein, the information related to the spatial filter and/or the reference signal includes at least one piece of the following information:

a spatial filter index and/or a beam index;

a reference signal index;

the number of antenna ports of a reference signal; antenna polarization information;

beam width information; and beam direction information.

45. The apparatus according to supplement 44, wherein, the number of antenna ports of the reference signal is 1 or 2.

46. The apparatus according to supplement 44, wherein, the antenna polarization information includes single polarization or multi-polarization.

47. The apparatus according to supplement 44, wherein, the beam width information includes the number of antenna ports in a first dimension and the number of antenna ports in a second dimension.

48. The apparatus according to supplement 44, wherein, the beam direction information includes a codebook index.

49. The apparatus according to supplement 48, wherein, the codebook index corresponds to an exit angle or an antenna transmission phase.

50. The apparatus according to any one of supplements 38-49, wherein the apparatus further includes:

a tenth module configured to receive report information from the repeater, the report information including information related to repeater capabilities.

51. The apparatus according to supplement 50, wherein the apparatus further includes:

an eleventh module configured to determine a scheduling and/or indication mode corresponding to repeater capabilities according to the report information.

52. The apparatus according to supplement 50 or 51, wherein, the report information includes at least one piece of the following information:

a maximum number of beams supported by the repeater; and antenna information of the repeater.

53. The apparatus according to supplement 52, wherein, the maximum number of beams supported by the repeater includes at least one of the following:

a maximum number of candidate spatial filters or a maximum number of candidate beams; and a maximum number of candidate spatial filter reference signals or candidate beam reference signals.

54. The apparatus according to supplement 53, wherein, the maximum number of candidate spatial filter reference signals or candidate beam reference signals includes a maximum number of antenna ports of the candidate spatial filter reference signals or candidate beam reference signals.

55. The apparatus according to supplement 52, wherein, the antenna information of the repeater includes at least one of the following:

antenna panel information;

antenna polarization information; and antenna dimension information.

56. The apparatus according to any one of supplements 38-55, wherein the apparatus further includes:

a twelfth module configured to establish connection with the repeater.

57. The apparatus according to any one of supplements 38-56, wherein, the repeater is a relay device.

58. The apparatus according to any one of supplements 38-57, wherein, the repeater is a repeater node.

59. A repeater, including the apparatus as described in any one of supplements 1-37.

60. A network device, including the apparatus as described in any one of supplements 38-58.

61. A communication system, including:

the repeater as described in supplement 59 and/or the network device as described in supplement 60, and a terminal equipment.

Supplement II

1. A wireless communication method, applicable to a repeater, the method including:

receiving indication information from a network device, the indication information including information related to a spatial filter and/or a reference signal.

2. The method according to supplement 1, wherein, the repeater is affiliated to a serving cell to which the network device corresponds.

3. The method according to supplement 1, wherein the indication information refers to at least one piece of the following indication information:

indication information used to indicate information related to a spatial filter and/or a reference signal used by the repeater in transmitting a first signal;

indication information used to indicate information related to a spatial filter and/or a reference signal used by the repeater in receiving a second signal;

indication information used to indicate that the repeater transmits a reference signal; and indication information used to indicate that the repeater receives a reference signal.

4. The method according to supplement 3, wherein, the first signal is a first forwarding signal that forwards a signal received from the network device to a terminal equipment;

and the second signal is a signal to be forwarded received from the network device, or the second signal is a signal to be forwarded received from a terminal equipment.

5. The method according to supplement 3, wherein, the indication information used to indicate that the repeater transmits a reference signal includes:

indication information used to indicate information related to a spatial filter and/or a reference signal used by the repeater in transmitting a reference signal.

6. The method according to supplement 3, wherein, the indication information used to indicate that the repeater receives a reference signal includes:

indication information used to indicate information related to a spatial filter and/or a reference signal used by the repeater in receiving a reference signal.

7. The method according to any one of supplements 1-6, wherein, the information related to the spatial filter and/or the reference signal includes at least one piece of the following information:

a spatial filter index and/or a beam index;

a reference signal index;

the number of antenna ports of a reference signal;

antenna polarization information;

beam width information; and beam direction information.

8. The method according to supplement 7, wherein, the number of antenna ports of the reference signal is 1 or 2.

9. The method according to supplement 7, wherein, the antenna polarization information includes single polarization or multi-polarization.

10. The method according to supplement 7, wherein, the beam width information includes the number of antenna ports in a first dimension and the number of antenna ports in a second dimension.

11. The method according to supplement 7, wherein, the beam direction information includes a codebook index.

12. The method according to supplement 11, wherein, the codebook index corresponds to an exit angle or an antenna transmission phase.

13. The method according to any one of supplements 1-12, wherein the method further includes:

transmitting a first signal and/or receiving a second signal by using a spatial filter to which the indication information corresponds.

14. The method according to supplement 1, wherein, the information related to the reference signal includes configuration information of the reference signal.

15. The method according to any one of supplements 1-12 and 14, wherein the method further includes:

transmitting and/or receiving a reference signal according to the indication information.

16. The method according to supplement 15, wherein the transmitting and/or receiving a reference signal according to the indication information includes:

transmitting and/or receiving the reference signal according to a spatial filter to which the indication information corresponds.

17. The method according to supplement 15 or 16, wherein the transmitting and/or receiving a reference signal according to the indication information includes:

transmitting a first reference signal to a terminal equipment according to the indication information.

18. The method according to supplement 17, wherein the method further includes:

transmitting the first signal to the terminal equipment and/or receiving a second signal from the terminal equipment by using a spatial filter determined according to the first reference signal.

19. The method according to supplement 17 or 18, wherein the method further includes:

transmitting the first signal to the terminal equipment and/or receiving the second signal from the terminal equipment by using a spatial filter identical to the spatial filter used in transmitting the first reference signal.

20. The method according to supplement 15 or 16, wherein the transmitting and/or receiving a reference signal according to the indication information includes:

receiving a second reference signal from a terminal equipment according to the indication information.

21. The method according to supplement 20, wherein the method further includes:

transmitting the first signal to the terminal equipment and/or receiving the second signal from the terminal equipment by using a spatial filter determined according to the second reference signal.

22. The method according to supplement 20 or 21, wherein the method further includes:

transmitting the first signal to the terminal equipment and/or receiving the second signal from the terminal equipment by using the spatial filter used in receiving the second reference signal.

23. The method according to supplement 15 or 16, wherein the transmitting and/or receiving a reference signal according to the indication information includes:

receiving at least two third reference signals according to the indication information.

24. The method according to supplement 23, wherein the at least two third reference signals are from different terminal equipments.

25. The method according to supplement 23 or 24, wherein the method further includes:

transmitting the first signal to a terminal equipment and/or receiving the second signal from a terminal equipment by using a spatial filter determined according to the at least two third reference signals.

26. The method according to supplement 15 or 16, wherein, the reference signal corresponds to downlink transmission from the repeater to terminal equipments.

27. The method according to supplement 15 or 16, wherein, the reference signal is used for communication with terminal equipments.

28. The method according to supplement 15 or 16, wherein, the reference signal includes at least one of an SSB, an SRS, a CSI-RS and a repeater-specific reference signal.

29. The method according to any one of supplements 1-28, wherein the method further includes:

transmitting report information to the network device, the report information including information related to repeater capabilities.

30. The method according to supplement 29, wherein, the report information is used for the network device to determine a scheduling and/or indication mode corresponding to repeater capabilities.

31. The method according to supplement 29 or 30, wherein, the report information includes at least one piece of the following information:

a maximum number of beams supported by the repeater; and antenna information of the repeater.

32. The method according to supplement 31, wherein, the maximum number of beams supported by the repeater includes at least one of the following:

a maximum number of candidate spatial filters or a maximum number of candidate beams; and a maximum number of candidate spatial filter reference signals or a maximum number of candidate beam reference signals.

33. The method according to supplement 32, wherein, the maximum number of candidate spatial filter reference signals or candidate beam reference signals includes a maximum number of antenna ports for candidate spatial filter reference signals or a maximum number of antenna ports for candidate beam reference signals.

34. The method according to supplement 31, wherein, the antenna information of the repeater includes at least one of the following:

antenna panel information;

antenna polarization information; and antenna dimension information.

35. The method according to any one of supplements 1-34, wherein the method further includes:

establishing connection with the network device.

36. The method according to any one of supplements 1-35, wherein, the repeater is a relay device.

37. The method according to any one of supplements 1-36, wherein, the repeater is a repeater node.

38. A wireless communication method, applicable to a network device, the method including:

transmitting indication information to a repeater, the indication information including information related to a spatial filter and/or a reference signal.

39. The method according to supplement 38, wherein, the repeater is affiliated to a serving cell to which the network device corresponds.

40. The method according to supplement 38, wherein, the indication information may refer to at least one piece of the following indication information:

indication information used to indicate information related to a spatial filter and/or a reference signal used by the repeater in transmitting a first signal;

indication information used to indicate information related to a spatial filter and/or a reference signal used by the repeater in receiving a second signal;

indication information used to indicate that the repeater transmits a reference signal; and indication information used to indicate that the repeater receives a reference signal.

41. The method according to supplement 40, wherein, the first signal is a first forwarding signal that forwards a signal received from the network device to a terminal equipment, and the second signal is a signal to be forwarded received from a terminal equipment.

42. The method according to supplement 40, wherein, the indication information used to indicate that the repeater transmits a reference signal includes:

indication information used to indicate information related to a spatial filter and/or a reference signal used by the repeater in transmitting a reference signal.

43. The method according to supplement 40, wherein, the indication information used to indicate that the repeater receives a reference signal includes:

indication information used to indicate information related to a spatial filter and/or a reference signal used by the repeater in receiving a reference signal.

44. The method according to any one of supplements 38-43, wherein, the information related to the spatial filter and/or the reference signal includes at least one piece of the following information:

a spatial filter index and/or a beam index;

a reference signal index;

the number of antenna ports of a reference signal; antenna polarization information;

beam width information; and beam direction information.

45. The method according to supplement 44, wherein, the number of antenna ports of the reference signal is 1 or 2.

46. The method according to supplement 44, wherein, the antenna polarization information includes single polarization or multi-polarization.

47. The method according to supplement 44, wherein, the beam width information includes the number of antenna ports in a first dimension and the number of antenna ports in a second dimension.

48. The method according to supplement 44, wherein, the beam direction information includes a codebook index.

49. The method according to supplement 48, wherein, the codebook index corresponds to an exit angle or an antenna transmission phase.

50. The method according to any one of supplements 38-49, wherein the method further includes:

receiving report information from the repeater, the report information including information related to repeater capabilities.

51. The method according to supplement 50, wherein the method further includes:

determining a scheduling and/or indication mode corresponding to repeater capabilities according to the report information.

52. The method according to supplement 50 or 51, wherein, the report information includes at least one piece of the following information:

a maximum number of beams supported by the repeater; and antenna information of the repeater.

53. The method according to supplement 52, wherein, the maximum number of beams supported by the repeater includes at least one of the following:

a maximum number of candidate spatial filters or a maximum number of candidate beams; and a maximum number of candidate spatial filter reference signals or candidate beam reference signals.

54. The method according to supplement 53, wherein, the maximum number of candidate spatial filter reference signals or candidate beam reference signals includes a maximum number of antenna ports of the candidate spatial filter reference signals or candidate beam reference signals.

55. The method according to supplement 52, wherein, the antenna information of the repeater includes at least one of the following:

antenna panel information;

antenna polarization information; and antenna dimension information.

56. The method according to any one of supplements 38-55, wherein the method further includes:

establishing connection with the repeater.

57. The method according to any one of supplements 38-56, wherein, the repeater is a relay device.

58. The method according to any one of supplements 38-57, wherein, the repeater is a repeater node.

The invention claimed is:

1. A repeater node, comprising:

a first module at least configured to establish connection with a network device, the first module being Repeater-MT (mobile terminal); and a second module configured to, for the repeater node, amplify and forward a signal between a terminal equipment and the network device;

wherein the repeater node receives indication information from the network device through the first module, the indication information being used to indicate:

a beam for the second module to transmit a first signal on the terminal side;

a beam for the second module to receive a second signal on the terminal side; or a same beam for the second module to transmit the first signal on the terminal side and receive the second signal on the terminal side;

wherein the first signal is a first forwarding signal that forwards a signal received from the network device to the terminal equipment, and the second signal is a signal to be forwarded received from the terminal device; and wherein the beam indicated by the indication information for the second module to transmit the first signal on the terminal side and the beam indicated by the indication information for the second module to receive the second signal on the terminal side have uplink and downlink reciprocity.

2. The repeater node according to claim 1, wherein, the signal between terminal equipment and the network device is an RF signal.

3. The repeater node according to claim 1, wherein, the indication information indicates, through a beam index:

the beam for the second module to transmit the first signal on the terminal side the beam for the second module to receive the second signal on the terminal side; or the same beam for the second module to transmit the first signal on the terminal side and receive the second signal on the terminal side.

4. The repeater node according to claim 1, wherein, the repeater node transmits the first signal using the beam indicated by the indication information and/or receives the second signal using the beam indicated by the indication information through the second module.

5. The repeater node according to claim 1, wherein, the repeater node amplifies the signal received from the network device through the second module to obtain the first signal, and the repeater node amplifies the second signal to be forwarded through the second module to obtain a second forwarding signal for the repeater node to transmit on the network side.

6. The repeater node according to claim 1, wherein, the repeater node establishes a connection with the network device through the first module, and the repeater node also transmits reporting information to the network device through the first module, and the reporting information comprising information related to the capability of the repeater node.

7. The repeater node according to claim 6, wherein, the reporting information further comprises parameters for repeater node capability.

8. The repeater node according to claim 6, wherein, the reporting information comprises at least one of the following:

a maximum number of beams supported by the repeater node; or antenna information of the repeater node.

9. The repeater node according to claim 8, wherein, the maximum number of beams supported by the repeater node comprises at least one of the following:

the maximum number of candidate spatial filters or candidate beams; or the maximum number of candidate spatial filter reference signals or candidate beam reference signals.

10. The repeater node according to claim 9, wherein, the maximum number of candidate spatial filter reference signals or candidate beam reference signals comprises the maximum number of antenna ports of the candidate spatial filter reference signals or candidate beam reference signals.

11. The repeater node according to claim 8, wherein, the antenna information of the repeater node comprises at least one of the following:

antenna panel information;

antenna polarization information; or antenna dimension information.

* * * * *